(12) United States Patent
Hankawa

(10) Patent No.: US 7,944,622 B2
(45) Date of Patent: May 17, 2011

(54) ZOOM LENS AND IMAGE PICKUP APPARATUS EQUIPPED WITH SAME

(75) Inventor: Masashi Hankawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 57 days.

(21) Appl. No.: 12/287,636

(22) Filed: Oct. 9, 2008

(65) Prior Publication Data

US 2009/0103186 A1 Apr. 23, 2009

(30) Foreign Application Priority Data

Oct. 17, 2007 (JP) ................................. 2007-270457
Oct. 17, 2007 (JP) ................................. 2007-270553

(51) Int. Cl.
*G02B 15/14* (2006.01)
(52) U.S. Cl. ........................................................ 359/690
(58) Field of Classification Search .................... 359/690
See application file for complete search history.

(56) References Cited

U.S. PATENT DOCUMENTS

| | | | |
|---|---|---|---|
| 6,028,717 A | 2/2000 | Kohno et al. | |
| 6,512,633 B2 * | 1/2003 | Konno et al. | 359/557 |
| 6,606,200 B1 | 8/2003 | Nakayama et al. | |
| 7,123,422 B2 * | 10/2006 | Suzuki | 359/690 |
| 2006/0098301 A1 | 5/2006 | Miyajima | |
| 2006/0291070 A1 | 12/2006 | Terada et al. | |

FOREIGN PATENT DOCUMENTS

| | | |
|---|---|---|
| JP | 11-006958 | 1/1999 |
| JP | 11-052244 | 2/1999 |
| JP | 2006-171055 | 6/2006 |
| JP | 2007-003554 | 1/2007 |
| JP | 2007-010695 | 1/2007 |

* cited by examiner

*Primary Examiner* — William C Choi
(74) *Attorney, Agent, or Firm* — Kenyon & Kenyon LLP

(57) ABSTRACT

A zoom lens is composed, in order from the object side thereof, of a front side lens unit having a negative refracting power at the wide angle end and a rear side lens unit having a positive refracting power at the wide angle end. The front side lens unit includes a first lens unit located closest to the object side and having a positive refracting power and a second lens unit located on the image side of the first lens unit and having a negative refracting power. The distance between the first lens unit and the second lens unit is larger at the telephoto end than at the wide angle end. The rear side lens unit includes a third lens unit located closer to the object side at the telephoto end than at the wide angle end and having a positive refracting power, the distance between the third lens unit and the second lens unit being smaller at the telephoto end than at the wide angle end. The third lens unit satisfies the following condition: $0.01 < f_3/f_t < 0.16 \ldots (1)$.

4 Claims, 15 Drawing Sheets

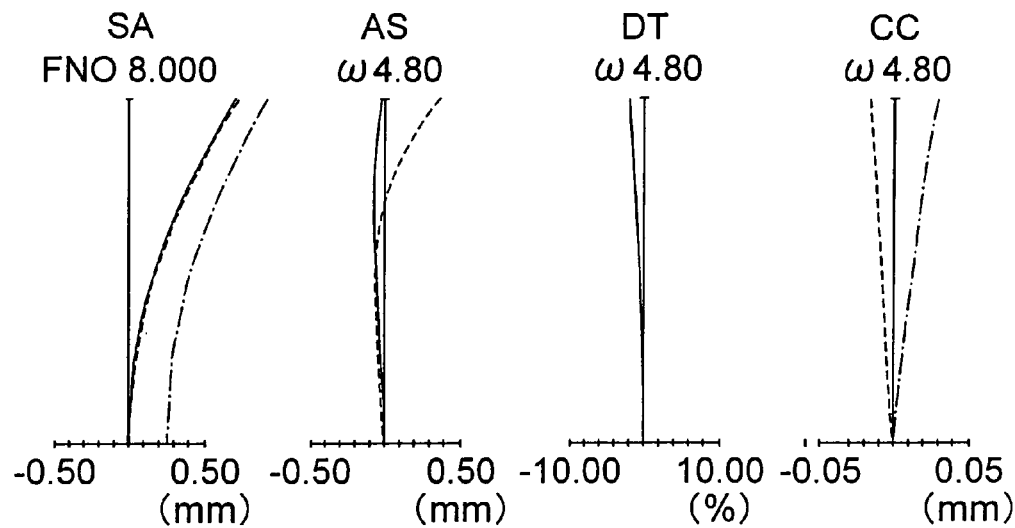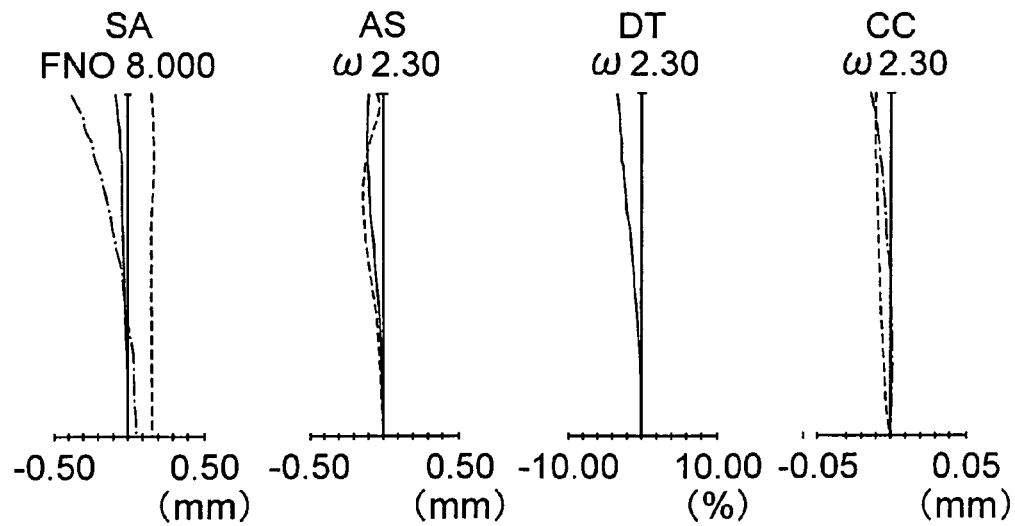

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application Nos. 2007-270457 filed on Oct. 17, 2007 and 2007-270553 filed on Oct. 17, 2007; the entire contents of which are incorporated herein by reference.

BACKGROUND OF THE INVENTION

1. Field of the Invention

The present invention relates a zoom lens and an image pickup apparatus equipped with the same.

2. Description of the Related Art

In recent years, digital cameras that pick up an image of an object using an image pickup element such as a CCD or CMOD sensor have replaced film cameras to become the mainstream. Furthermore, various categories of digital cameras ranging from popular-priced compact types to advanced types for professionals have been developed. Among these is a type of camera having a lens with a zoom ratio of about 10 or higher that is accommodated in the camera body when not in use so that it becomes compact.

Zoom lenses having a zoom ratio of about 10 or higher include, for example, a type of zoom lens having, in order from the object side thereof, a first lens unit having a positive refracting power, a second lens unit having a negative refracting power and a third lens unit having a positive refracting power as know from Japanese Patent Application Laid-Open Nos. 11-5244, 11-6958, 2006-171055, 2007-10695 and 2007-3554.

SUMMARY OF THE INVENTION

A first zoom lens according to one aspect of the present invention consists, in order from the object side thereof, of:

a front side lens unit having a negative refracting power at the wide angle end; and a rear side lens unit having a positive refracting power at the wide angle end, wherein the front side lens unit comprises a first lens unit located closest to the object side and having a positive refracting power and a second lens unit located on the image side of the first lens unit and having a negative refracting power, the distance between the first lens unit and the second lens unit is larger at the telephoto end than at the wide angle end, the rear side lens unit comprises a third lens unit located closer to the object side at the telephoto end than at the wide angle end and having a positive refracting power, the distance between the third lens unit and the second lens unit being smaller at the telephoto end than at the wide angle end, and the third lens unit satisfies the following condition:

$$0.01 < f_3/f_t < 0.16 \tag{1}$$

where $f_3$ is the focal length of the third lens unit, and $f_t$ is the focal length of the entire zoom lens system at the telephoto end.

A second zoom lens according to another aspect of the present invention consists, in order from the object side thereof, of:

a front side lens unit having a negative refracting power at the wide angle end; and a rear side lens unit having a positive refracting power at the wide angle end, wherein the front side lens unit comprises a first lens unit located closest to the object side and having a positive refracting power and a second lens unit located on the image side of the first lens unit and having a negative refracting power, the distance between the first lens unit and the second lens unit being larger at a telephoto end than at the wide angle end, the rear side lens unit comprises a third lens unit located closer to the object side at the telephoto end than at the wide angle end and having a positive refracting power, the distance between the third lens unit and the second lens unit being smaller at the telephoto end than at the wide angle end, and the first lens unit satisfies the following condition:

$$0.15 < f_1/f_t < 0.50 \tag{2}$$

where $f_1$ is the focal length of the first lens unit, and $f_t$ is the focal length of the entire zoom lens system at the telephoto end.

A third zoom lens according to still another aspect of the present invention consists, in order from an object side thereof, of:

a front side lens unit having a negative refracting power at a wide angle end; and a rear side lens unit having a positive refracting power at the wide angle end, wherein the front side lens unit consists of a first lens unit having a positive refracting power and a second lens unit having a negative refracting power, the rear side lens unit consists of a third lens unit having a positive refracting power and a rear lens unit on the image side of the third lens unit, during zooming from the wide angle end to the telephoto end, distances between the first lens unit, the second lens unit, the third lens unit and the rear lens unit respectively change, the distance between the first lens unit and the second lens unit is larger at the telephoto end than at the wide angle end, the distance between the second lens unit and the third lens unit is smaller at the telephoto end than at the wide angle end, the distance between the third lens unit and the rear lens unit at the telephoto end is different from that at the wide angle end, the first lens unit is located closer to the object side at the telephoto end than at the wide angle end, the third lens unit is located closer to the object side at the telephoto end than at the wide angle end, and the zoom lens satisfies the following condition:

$$0.10 < (\Sigma D_{1-R})/f_t < 0.28 \tag{10}$$

where $\Sigma D_{1-R}$ is the sum of the thicknesses, on the optical axis, of the first lens unit, the second lens unit, the third lens unit and the rear lens unit, the thickness of each lens unit referring to the actual distance from the object side surface of the lens located closest to the object side in that lens unit to the image side surface of the lens located closest to the image side in that lens unit, and $f_t$ is the focal length of the entire zoom lens system at the telephoto end.

A fourth zoom lens according to still another aspect of the present invention consists, in order from the object side thereof, of:

a front side lens unit having a negative refracting power at a wide angle end; and a rear side lens unit having a positive refracting power at the wide angle end, wherein the front side lens unit consists of a first lens unit having a positive refracting power and a second lens unit having a negative refracting power, the rear side lens unit consists of a third lens unit having a positive refracting power and a rear lens unit on the image side of the third lens unit, during zooming from the wide angle end to the telephoto end, distances between the first lens unit, the second lens unit, the third lens unit and the rear lens unit respectively change, the distance between the first lens unit and the second lens unit is larger at the telephoto end than at the wide angle end, the distance between the second lens unit and the third lens unit is smaller at the telephoto end than at the wide angle end, the distance between the third lens unit and the rear lens unit at the telephoto end is different from that at the wide angle end, the first lens unit is located closer to the object side at the telephoto end than at the wide angle end, the third lens unit is located closer to the object side at the telephoto end than at the wide angle end, and the zoom lens satisfies the following condition:

$$0.05 < (\Sigma D_{12R})/f_t < 0.19 \tag{11}$$

where $\Sigma D_{12R}$ is the sum of the thicknesses, on the optical axis, of the first lens unit, the second lens unit and the rear lens unit, the thickness of each lens unit referring to an actual distance from an object side surface of the lens located closest to the object side in that lens unit to an image side surface of the lens located closest to the image side in that lens unit, and $f_t$ is the focal length of the entire zoom lens system at the telephoto end.

An image pickup apparatus according to still another aspect of the present invention comprises:

a zoom lens; and an image pickup element disposed on the image side of the zoom lens that converts an image formed by the zoom lens into an electrical signal, wherein the zoom lens is at least any one of the above-described first to fourth zoom lenses.

BRIEF DESCRIPTION OF THE DRAWINGS

FIG. 1A shows the state at the wide angle end, FIG. 1B shows a first intermediate focal length state and FIG. 1C shows a second intermediate focal length state, FIG. 1D shows a third intermediate focal length state, and FIG. 1E shows the state at the telephoto end;

FIG. 4A shows aberrations at the wide angle end, FIG. 4B shows aberrations in the first intermediate focal length state and FIG. 4C shows aberrations in the second intermediate focal length state;

FIGS. 5D and 5E are diagrams showing spherical aberration, astigmatism, distortion and chromatic aberration of magnification in the first embodiment in the state in which the zoom lens is focused on an object point at infinity, where FIG. 5D shows aberrations in the third intermediate focal length state and FIG. 5E shows aberrations at the telephoto end;

DETAILED DESCRIPTION OF THE INVENTION

Figure 1A:
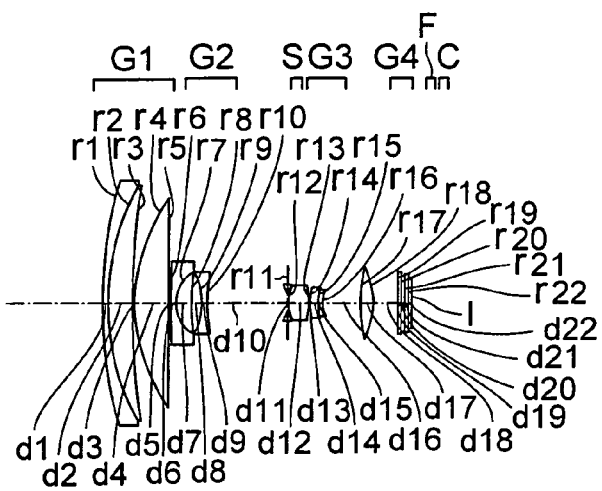
FIGS. 1A, 1B, 1C, 1D and 1E are cross sectional views taken along an optical axis showing the configuration of a first embodiment of the zoom lens according to the present invention in the state in which the zoom lens is focused on an object point at infinity, where
Figure 1B:
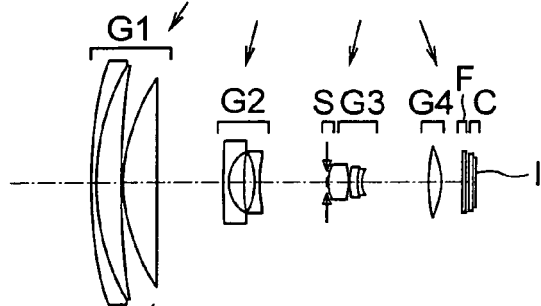
Figure 1C:
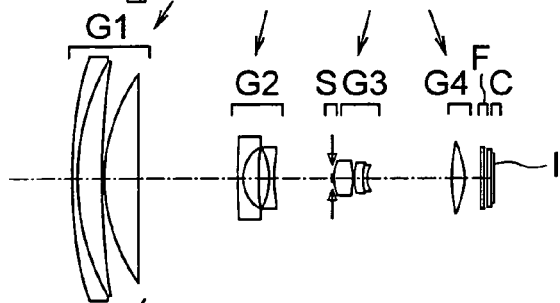
Figure 1D:
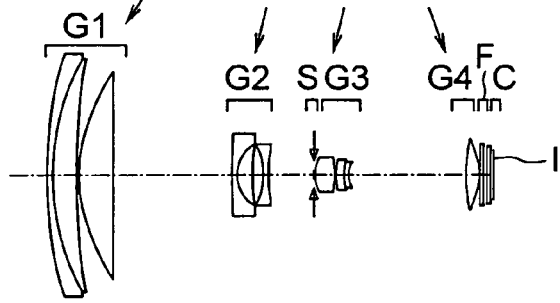
Figure 1E:
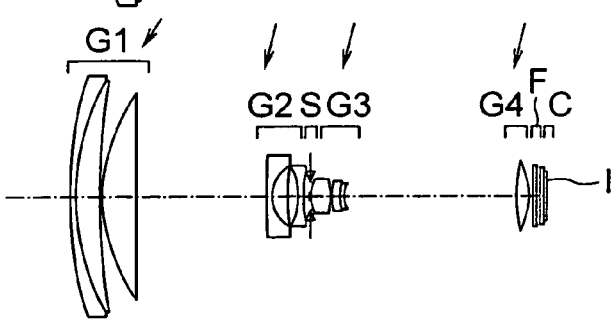
Figure 2A:
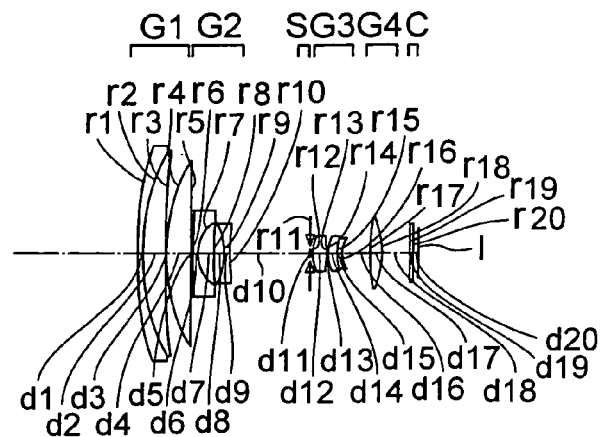
FIGS. 2A, 2B, 2C, 2D and 2E are cross sectional views similar to FIGS. 1A, 1B, 1C, 1D and 1E respectively, showing the configuration of a second embodiment of the zoom lens according to the present invention.
Figure 2B:
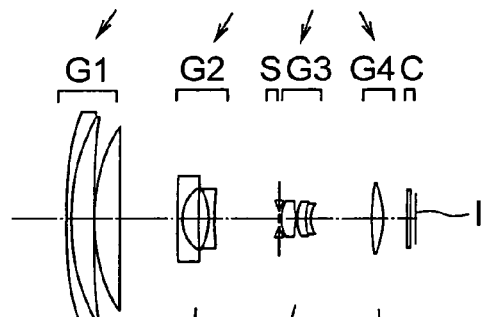
Figure 2C:
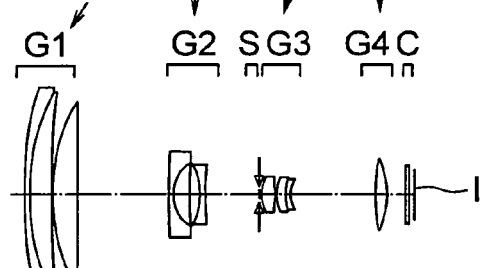
Figure 2D:
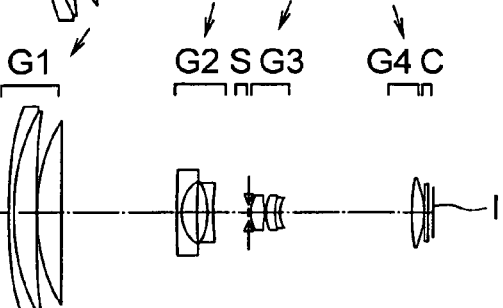
Figure 2E:
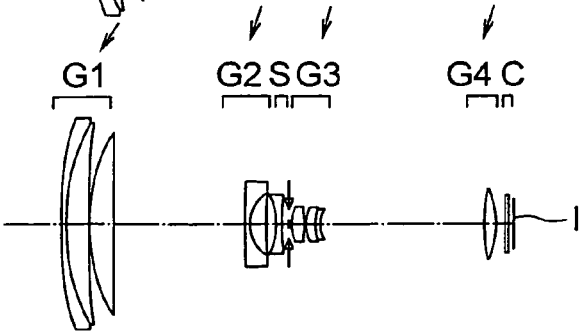
Figure 3A:
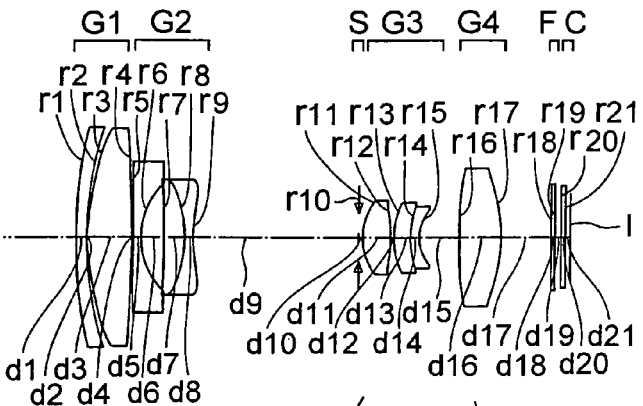
FIGS. 3A, 3B, 3C, 3D and 3E are cross sectional views similar to FIGS. 1A, 1B, 1C, 1D and 1E respectively, showing the configuration of a third embodiment of the zoom lens according to the present invention.
Figure 3B:
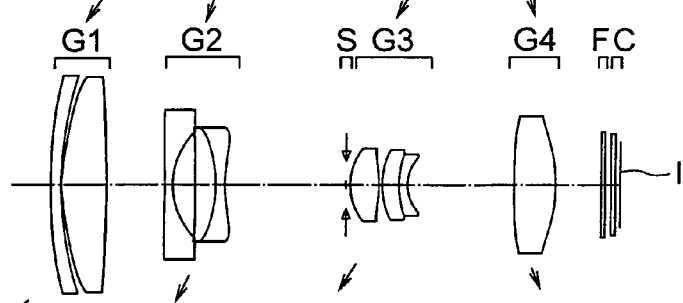
Figure 3C:
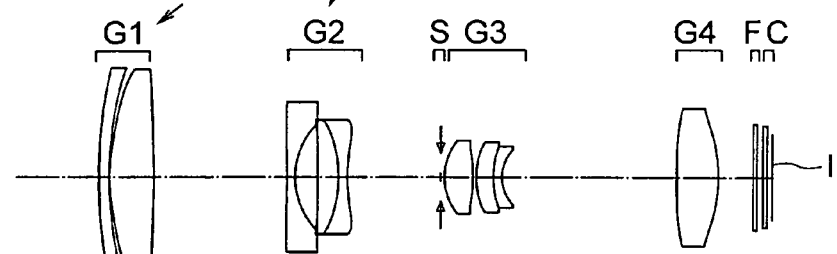
Figure 3D:
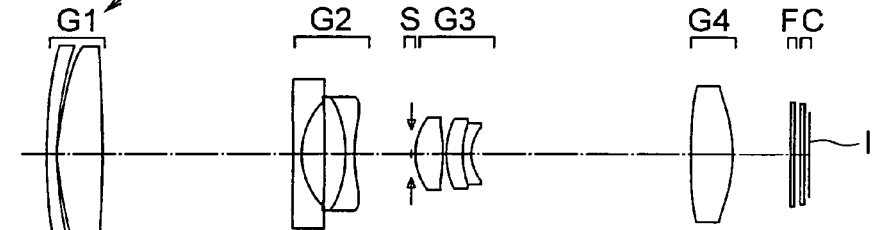
Figure 3E:
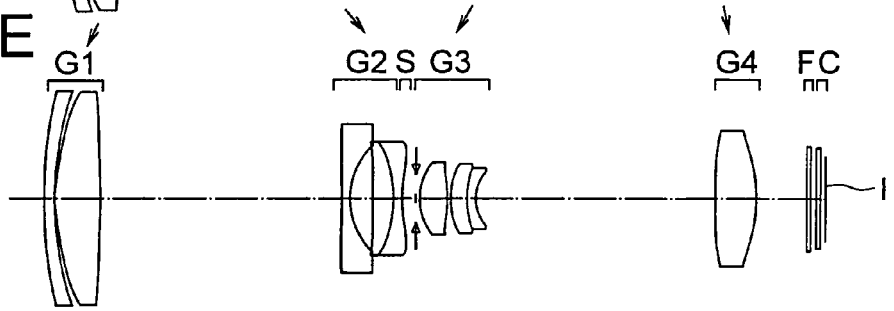

The basic configuration of the first zoom lens according to the present invention is that the zoom lens is composed, in order from the object side thereof, of:

a front side lens unit having a negative refracting power at the wide angle end; and a rear side lens unit having a positive refracting power at the wide angle end, wherein the front side lens unit includes a first lens unit having a positive refracting power located closest to the object side, and a second lens unit having a negative refracting power disposed on the image side of the first lens unit, the distance between the first lens unit and the second lens unit is larger at the telephoto end than at the wide angle end, and the rear side lens unit includes a third lens unit having a positive refracting power, the distance between the third lens unit and the second lens unit being smaller at the telephoto end than at the wide angle end.

By this configuration, the front side lens unit and the rear side lens unit forms a kind of retrofocus-type lens configuration at the wide angle end, which is advantageous in achieving an adequately large angle of field at the wide angle end.

In addition, by increasing the distance between the first lens unit and the second lens unit, it becomes easy to provide the second lens unit having a negative refracting power with an adequate magnification changing function.

By making the third lens unit having a positive refracting power in the rear side lens unit closer to the second lens unit, it becomes also easy to provide the third lens unit with a magnification changing function.

Furthermore, in the first zoom lens according to the present invention, in the above-described zoom lens, the third lens unit has a refracting power that satisfies the following conditional expression (1), and the third lens unit is moved in such a way as to be located closer to the object side at the telephoto end than at the wide angle end:

$$0.01 < f_3/f_t < 0.16 \quad (1)$$

where $f_3$ is the focal length of the third lens unit, and $f_t$ is the focal length of the entire zoom lens system at the telephoto end.

By making the refracting power of the third lens unit relative to the refracting power of the entire zoom lens system at the telephoto end larger as compared to prior arts, it becomes easy to provide the rear side lens unit with an adequate positive refracting power at the wide angle end. This is advantageous in making the entire length of the zoom lens at the wide angle end shorter and in making the focal length at the wide angle end shorter.

Furthermore, displacing the third lens unit having a positive refracting power toward the object side is advantageous in providing the third lens unit with a sufficient magnification changing function and in making the entire length of the zoom lens at the telephoto end shorter.

Conditional expression (1) regulates the refracting power of the third lens unit.

By designing the third lens unit in such a way that the lower limit of conditional expression (1) is not exceeded, it becomes easy to reduce the number of lenses required to suppress generation of aberrations (primarily, spherical aberration) in the third lens unit. This is advantageous in reducing the size.

By designing the third lens unit in such a way that the upper limit of conditional expression (1) is not exceeded, it becomes easy to design the third lens unit in such a way as to provide adequate magnification change. This is advantageous in reducing the size and in making the zoom ratio high.

Furthermore, the first lens unit may be designed in such a way as to be located closer to the object side at the telephoto end than at the wide angle end. This is advantageous in increasing the zoom ratio and in reducing the entire length at the wide angle end and in other respects.

In the second zoom lens according to the present invention, the first lens unit in the above-described basic zoom lens is configured to have a refracting power that satisfies the following conditional expression (2), and the first lens unit is moved in such a way as to be located closer to the object side at the telephoto end than at the wide angle end:

$$0.15 < f_1/f_t < 0.50 \quad (2)$$

where $f_1$ is the focal length of the first lens unit, and $f_t$ is the focal length of the entire zoom lens system at the telephoto end.

Thus, the refracting power of the first lens unit relative to the refracting power of the entire zoom lens system at the telephoto end is made higher as compared to prior arts. This provides further advantages in providing adequate magnification change by the second lens unit having a negative refracting power. In addition, by locating the first lens unit closer to the object side at the telephoto end than at the wide angle end, the entire length of the zoom lens at the wide angle end can be made smaller. This is also advantageous in making the diameter of the first and second lens units smaller. This also facilitates reduction in variations of the F-number necessitated by an increased zoom ratio.

Conditional expression (2) regulates the refracting power of the first lens unit.

By designing the first lens unit in such a way that the lower limit of conditional expression (2) is not exceeded, it becomes easy to reduce the number of lenses required to reduce generation of aberrations (primarily, spherical aberration at the telephoto end) in the first lens unit. This is advantageous in making the size of the first lens unit smaller.

By designing the first lens unit in such a way that the upper limit of conditional expression (2) is not exceeded, it becomes easy to provide adequate magnification change by the second lens unit. This is advantageous in achieving a high zoom ratio while making the change in the distance between the first lens unit and the second lens unit small and in making the entire length of the zoom lens at the telephoto end smaller.

Furthermore, it is preferred that the third lens unit be located closer to the object side at the telephoto end than at the wide angle end. This is advantageous in providing the third lens unit with an adequate magnification changing function.

It is more preferred that the feature of the first zoom lens and the feature of the second zoom lens be both adopted in order to achieve better balance between increase in the zoom ratio and reduction in the entire length of the zoom lens.

In either one of the above described zoom lenses, it is preferred that one or some of the following features be adopted.

It is preferred that the second lens unit satisfy the following condition:

$$0.01 < |f_2|/f_t < 0.10 \quad (3)$$

where $f_2$ is the focal length of the second lens unit.

Conditional expression (3) specifies preferred refracting powers for the second lens unit from the viewpoint of achieving good balance between the compactness and optical performance.

By designing the second lens unit in such a way that the lower limit of conditional expression (3) is not exceeded, it becomes easy to suppress generation of spherical aberration and curvature of field in the second lens unit.

Designing the second lens unit in such a way that the upper limit of conditional expression (3) is not exceeded is advantageous in providing the second lens unit with an adequate magnification changing function and in reducing the size of the lens barrel with reduction in the entire length of the zoom lens.

It is also preferred that the first lens unit and the second lens unit satisfy the following condition in relation to each other:

$$1.26 < \Sigma D1/\Sigma D2 < 3.00 \quad (4)$$

where $\Sigma D1$ is the thickness (i.e. the length along the optical axis) of the first lens unit on the optical axis, and $\Sigma D2$ is the thickness of the second lens unit on the optical axis, the thickness of each lens unit on the optical axis referring to the actual distance from the object side surface of the lens located closest to the object side in the lens unit to the image side surface of the lens located closest to the image side in the lens unit.

Conditional expression (4) specifies preferred ratios of the thickness of the first lens unit to the thickness of the second lens unit.

To achieve an adequately large angle of field at the wide angle end and a high zoom ratio, it is preferred that spherical aberration at zoom positions near the telephoto end and curvature of field at zoom positions near the wide angle end be corrected excellently.

Designing the zoom lens in such a way that the lower limit of conditional expression (4) is not exceeded so as to make the thickness of the second lens unit appropriately small and make the thickness of the first lens unit on the optical axis appropriately large is advantageous in providing the first lens unit with an adequate refracting power, achieving an adequate effective diameter at the wide angle end while achieving a wide angle of field, correcting spherical aberration at zoom positions near the telephoto end and correcting curvature of field at zoom positions near the wide angle end.

Designing the zoom lens in such a way that the upper limit of conditional expression (4) is not exceeded so as to prevent the first lens unit from becoming large is advantageous in reducing the size. Alternatively, the second lens unit may be designed to have an appropriately large thickness, which makes it easy to provide the second lens unit with an adequate refracting power and achieve adequate optical performance.

It is preferred that the second lens unit be composed of two negative lenses and one positive lens.

Thus, the negative refracting power of the second lens unit is distributed to the two negative lenses, and aberrations are cancelled by the one positive lens. This is advantageous in slimming the second lens unit and reducing variations in aberrations even though the second lens has a magnification changing function.

It is also preferred that a fourth lens unit having a positive refracting power be provided on the image side of the third lens unit and an iris stop be provided between the second lens unit and the fourth lens unit.

By providing the fourth lens unit, it becomes easy to locate the exit pupil at a farther position from the image plane, which is advantageous in achieving adequate peripheral light quantity in the case where an image pickup element such as a CCD or a CMOS sensor is used with the zoom lens.

It is also preferred that the zoom lens be a four-unit zoom lens.

By configuring the zoom lens as a four-unit zoom lens with a positive-negative-positive-positive refracting power arrangement (in order from the object side,) of the lens units, load on a mechanism for driving lens units can be made small.

It is also preferred that during zooming from the wide angle end to the telephoto end, the first lens unit move in such a way as to be located closer to the object side at the telephoto end than at the wide angle end, the second lens unit move, the third lens unit move in such a way as to be located closer to the object side at the telephoto end than at the wide angle end, the fourth lens unit move, and the iris stop move in such a way as to be located closer to the object side at the telephoto end than at the wide angle end.

By moving these lens units, it becomes easy to reduce variations in aberrations with an increase in the zoom ratio and to arrange distribution of amounts of movement of the lens units.

By moving the iris stop in such a way that it is located closer to the object side at the telephoto end than at the wide angle end, the size of the third lens unit can easily be made small, and it becomes preferably easy to provide an adequate degree of freedom in designing the movement ranges of the second lens unit and the third lens unit.

Furthermore, the movements of the respective lens unit during zooming from the wide angle end to the telephoto end may be designed as follows. The first lens unit may be moved only toward the object side or along a locus that is convex toward the object side or the image side. The second lens may be moved only toward the object side or along a locus that is convex toward the object side or the image side. The third lens may be moved only toward the object side or along a locus that is convex toward the object side. The fourth lens unit may be moved in such a way as to be located closer to the object side or the image side at the telephoto end than at the wide angle end.

It may be moved monotonously or along a locus that is convex toward the object side or the image side.

It is also preferred that the fourth lens unit having a positive refracting power be moved in such a way as to be located closer to the image side at the telephoto end than at the wide angle end.

By providing the fourth lens unit with a magnification increasing function, the movement amounts of the lens units that move during zooming can be made smaller. This is advantageous in achieving both a sufficiently high zoom ratio and reduction in the size of the lens frame.

It is preferred that the fourth lens unit be the lens unit closest to the image side among the lens units in the zoom lens and satisfy the following condition:

$$0.05 < f_4/f_t < 0.30 \qquad (5)$$

where $f_4$ is the focal length of the fourth lens unit.

Providing the fourth lens unit closest to the image side is advantageous in controlling astigmatism.

Conditional expression (5) specifies preferred refracting powers for the fourth lens unit.

It is preferred to design the fourth lens unit in such a way that the lower limit of conditional expression (5) is not exceeded thereby preventing overcorrection of astigmatism and that the upper limit of conditional expression (5) is not exceeded to prevent undercorrection thereof.

When some of conditional expressions (1), (2), (3), (4) and (5) are satisfied simultaneously, it is easy to achieve favorable distribution of refracting powers to the respective lens units, which provides further advantages in reducing the size of the zoom lens while achieving a high zoom ratio.

It is also preferred that the zoom lens be provided with an iris stop and a shutter located between the second lens unit and the third lens unit, and the iris stop and the shutter be moved integrally with the third lens unit and located closer to the object side at the telephoto end than at the wide angle end.

By this feature, the entrance pupil can be located at a position near the object side and the exit pupil can be located far from the image plane. In addition, since the shutter is located at a position at which the height of off-axis rays is low, a large-size shutter unit is not required and the dead space associated with the movement of the iris stop and the shutter unit can be made small.

By moving the iris stop, effective correction of spherical aberration can be achieved, which not only is effective in improving the performance but also enables appropriate control of the position of the entrance pupil and the position of the exit pupil. This means that the height of off-axis rays at the wide angle end and the height of off-axis rays at the telephoto end can be well balanced, and the outer diameter of the first lens unit and the outer diameter of the lens unit closest to the image side can be made small with good balance. In particular, a reduction of the outer diameter of the first lens unit at the wide angle end effectively leads also to a reduction in the size of the lens with respect to the thickness direction (i.e. the direction along the optical axis) Furthermore, variations in the position of the exit pupil during zooming can be controlled or made small. Thus, in cases where an image pickup element such as a CCD or a CMOS sensor is used the zoom lens, the incidence angle of rays on the image pickup element can be kept within an appropriate range, and therefore shading in the regions near the corners of the image area can be prevented from occurring.

It is also preferred that the first lens unit have a negative lens and a positive lens.

This facilitates reduction of chromatic aberration at zoom positions near the telephoto end that tends to be conspicuous when the zoom lens has a high zoom ratio.

Furthermore, if the first lens unit is configured to include a cemented lens having a negative lens and a positive lens, deterioration of the optical performance due to relative decentering of lenses caused by assembly errors can be prevented, which is conducive to improvement of the throughput and cost reduction.

The negative lens and the positive lens in the first lens unit may be independent lens components that are not cemented. In this case, it is possible to correct spherical aberration at the telephoto end more effectively.

Furthermore, by constituting the first lens unit by the two lenses (i.e. the negative lens and the positive lens), the lens unit can be made more compact with respect to the optical axis direction and the diametrical direction.

It is also preferred that the zoom lens satisfy the following conditions:

$$9 < f_t/f_w < 50 \tag{6}$$

$$1.1 < L_t/L_w < 2.0 \tag{7}$$

where $f_w$ is the focal length of the entire zoom lens system at the wide angle end, $L_t$ is the actual distance, on the optical axis, from the lens surface closest to the object side in the first lens unit to the image plane at the telephoto end, and $L_w$ is the actual distance, on the optical axis, from the lens surface closest to the object side in the first lens unit to the image plane at the wide angle end.

Conditional expression (6) relates to the ratio of the focal length of the entire zoom lens system at the wide angle end and that at the telephoto end.

It is preferred, in taking advantage of the above described features, that the zoom lens be designed to have such a high zoom ratio that the lower limit of conditional expression (6) is not exceeded.

By designing the zoom lens in such a way that the upper limit of conditional expression (6) is not exceeded, an increase in the number of lens units or an increase in the number of lenses required for providing appropriate optical performance can be easily prevented.

Conditional expression (7) relates to the ratio of the entire length of the zoom lens at the wide angle end to the entire length of the zoom lens at the telephoto end.

It is preferred that the zoom lens be designed in such a way that the lower limit of conditional expression (7) is not exceeded thereby reducing the entire length of the zoom lens at the wide angle end to achieve reduction in the size with respect to the diametrical direction and facilitating achievement of a high zoom ratio by designing the zoom lens in such a way as to have an adequate overall length at the telephoto end.

In the case where the image pickup apparatus is equipped with a flash unit, it is necessary to take care of vignetting or partial blocking of flash by the barrel of the zoom lens at the time of photographing at wide angle positions. By reducing the entire length of the zoom lens at the wide angle end, it becomes easy to reduce unevenness in brightness due to vignetting of flash without disposing the flash unit at a position far from the zoom lens. This is advantageous in reducing the overall size of the image pickup apparatus and in achieving an adequately wide angle of field at the wide angle end.

Designing the zoom lens in such a way that the upper limit of conditional expression (7) is not exceeded to make variations in the entire length of the zoom lens small is advantageous in reducing the size of a lens frame for driving the zoom lens.

It is also preferred that the zoom lens satisfy the following condition at the telephoto end:

$$5.6 < F_t < 16.0 \tag{8}$$

where $F_t$ is the F-number of the zoom lens at the telephoto end or the minimum F-number in the case where the F-number is variable.

Conditional expression (8) regulates the F-number at the telephoto end.

Designing the zoom lens in such a way that the lower limit of conditional expression (8) is not exceeded is advantageous in reducing influences of spherical aberration and chromatic aberration of magnification that tend to be conspicuous when the zoom lens has a high zoom ratio. This is also advantageous in reducing the size of each lens unit.

By designing the zoom lens in such a way that the upper limit of conditional expression (8) is not exceeded, influences of hand vibration that tend to be conspicuous when the zoom lens has a high zoom ratio can be made smaller, which allows a mechanism for vibration reduction and/or image processing for blur correction to be made simple and easy.

It is preferred that every lens unit included in the zoom lens have an aspheric lens surface.

If this is the case, influences of aberrations in the zoom lens having a high zoom ratio can be reduced in each lens unit, which is advantageous in, for example, reducing the total number of lenses included in the zoom lens.

It is preferred that the total number of lenses included in the zoom lens be in the range of 8 to 12, each of the first and third lens units have a negative lens and a positive lens, and the second lens unit have a positive lens and a plurality of negative lenses.

Having 8, 9, 10, 11 or 12 lenses in total is advantageous in reducing variations in aberrations associated with a high zoom ratio, in reducing the size of the zoom lens at the time when the lens barrel is collapsed and in reducing the cost.

Having both a positive lens and a negative lens in each of the first, second and third lens units is advantageous in reducing generation of aberrations in each lens unit. Having a plurality of negative lenses in the second lens unit enables the second lens unit to have an adequate refracting power while suppressing influences of aberrations, which is advantageous in reducing the size and in achieving a high zoom ratio.

Next, the third zoom lens according to the present invention will be described.

The basic configuration of the third zoom lens according to the present invention is that the zoom lens is composed, in order from the object side thereof, of:

a front side lens unit having a negative refracting power at the wide angle end, and a rear side lens unit having a positive refracting power at the wide angle end, wherein the front side lens unit is composed, in order from the object side, of a first lens unit having a positive refracting power and a second lens unit having a negative refracting power, the rear side lens unit is composed, in order from the object side, of a third lens unit having a positive refracting power and a rear lens unit located on the image side thereof, and during zooming from the wide angle end to the telephoto end, the distances between the first lens unit, the second lens unit, the third lens unit and the rear lens unit respectively change, where the distance between the first lens unit and the second lens unit is larger at the telephoto end than at the wide angle end, the distance between the second lens unit and the third lens unit is smaller at the telephoto end than at the wide angle end, the distance between the third lens unit and the rear lens unit at the telephoto end is different from that at the wide angle end, the first lens unit is located closer to the object side at the telephoto end than at the wide angle end, and the third lens unit is located closer to the object side at the telephoto end than at the wide angle end.

By this configuration, the front side lens unit and the rear side lens unit forms a kind of retrofocus-type lens configuration at the wide angle end, which is advantageous in achieving an adequately large angle of field at the wide angle end.

By increasing the distance between the first lens unit and the second lens unit during zooming from the wide angle end to the telephoto end, it becomes easy to provide the second lens unit having a negative refracting power with an adequate magnification changing function.

By bringing the third lens unit having a positive refracting power in the rear side lens unit closer to the second lens unit during zooming from the wide angle end to the telephoto end, it becomes easy to provide the third lens unit also with a magnification changing function.

By moving the first lens unit in the above described manner, it becomes easy to reduce the entire length at the wide angle end and achieve a sufficiently high zoom ratio. Thus, such a way of movement is advantageous in achieving size reduction and high zoom ratio.

By moving the third lens unit in the above described manner, it becomes easy to provide the third lens unit also with a magnification changing function, which is advantageous in achieving a sufficiently high zoom ratio.

Providing the rear lens unit closest to the image side is advantageous in controlling astigmatism.

Furthermore, the third zoom lens according to the present invention satisfies the following condition:

$$0.10 < (\Sigma D_{1-R})/f_t < 0.28 \quad (10)$$

where $\Sigma D_{1-R}$ is the sum of the thicknesses, on the optical axis, of the first lens unit, the second lens unit, the third lens unit and the rear lens unit, the thickness of each lens unit referring to the actual distance from the object side surface of the lens located closest to the object side in the lens unit to the image side surface of the lens located closest to the image side in the lens unit, $f_t$ is the focal length of the entire zoom lens system at the telephoto end.

Conditional expression (10) provides a condition for reducing the size of the zoom lens at the time when the lens barrel is collapsed and achieving adequate optical performance when the zoom lens has a high zoom ratio.

It is preferred that the zoom lens is designed in such a way that the lower limit of conditional expression (10) is not exceeded so as to provide sufficient thickness of the lens units required for aberration correction.

It is preferred that the zoom lens is designed in such a way that the upper limit of conditional expression (10) is not exceeded so as to restrict the thickness, on the optical axis, of each lens unit thereby facilitating reduction in the size in the state in which the lens barrel is collapsed.

A fourth zoom lens according to the present invention is characterized in that in the above-described basic zoom lens, the following condition is satisfied:

$$0.05 < (\Sigma D_{12R})/f_t < 0.19 \quad (11)$$

where $\Sigma D_{12R}$ is the sum of the thicknesses, on the optical axis, of the first lens unit, the second lens unit and the rear lens unit, the thickness of each lens unit referring to the actual distance from the object side surface of the lens located closest to the object side in the lens unit to the image side surface of the lens located closest to the image side in the lens unit, and $f_t$ is the focal length of the entire zoom lens system at the telephoto end.

According to a known method, in order to decrease the length of the zoom lens along the optical axis at the time when the lens barrel is collapsed, a certain lens unit(s) is retracted to a position away from the optical axis and kept at that position when the lens barrel of the zoom lens is collapsed.

In the zoom lens having the above-described basic configuration, the third lens unit, which can be relatively easily made small in size, may be retracted away from the optical axis when the lens barrel is collapsed.

When such a collapse method is adopted, since the third lens unit is retracted, what is relevant significantly to the thickness (or the dimension along the optical axis) of the image pickup apparatus at the time when the lens barrel is collapsed is the sum of the thickness, along the optical axis, of the first lens unit, the thickness, along the optical axis, of the second lens unit and the thickness, along the optical axis, of the rear lens unit.

On the other hand, if the sum of the thicknesses of the first lens unit, the second lens unit and the rear lens unit is too small relative to the focal length $f_t$ at the telephoto end, the optical performance will be affected to a considerable degree.

By designing the zoom lens in such a way that the lower limit of conditional expression (11) is not exceeded, it becomes easy to suppress generation of off-axis aberrations at the wide angle end and spherical aberration at the telephoto end.

By designing the zoom lens in such a way that the upper limit of conditional expression (11) is not exceeded, it becomes easy to restrict the thicknesses, on the optical axis, of lens units among the first lens unit, the second lens unit and the rear lens unit thereby facilitating reduction in the size in the state in which the lens barrel is collapsed.

It is more preferred that the feature of the third zoom lens and the feature of the third zoom lens be both adopted in order to achieve a high zoom ratio and a reduction in the size of the zoom lens in the state in which the lens barrel is collapsed.

In any one of the above described zoom lenses, it is preferred that one or some of the following features be adopted.

It is preferred that the rear lens unit have a positive refracting power. This makes it easy to locate the exit pupil at a farther position from the image plane, which facilitates reduction of color shading of an image etc. when an image pickup element is used with the zoom lens.

It is also preferred that the focal length of the rear lens unit be constant during zooming from the wide angle end to the telephoto end. By this feature, the number of moving lens units is reduced, and the number of lens frames for moving the lens units can be reduced. This facilitates simplification of the structure of the zoom lens.

It is preferred that the third lens unit satisfy the following condition:

$$0.03 < \Sigma d_3/f_t < 0.075 \quad (12)$$

where $\Sigma d_3$ is thickness of the third lens unit on the optical axis.

Conditional expression (12) specifies preferred thicknesses for the third lens unit from the viewpoint of achieving good balance between the compactness and optical performance.

Designing the third lens unit in such a way that the lower limit of conditional expression (12) is not exceeded is advantageous in providing an adequate refracting power and in reducing aberrations.

Designing the third lens unit in such a way that the upper limit of conditional expression (12) is not exceeded is advantageous in reducing the size of the zoom lens at the time when the lens barrel is collapsed.

It is preferred that the first lens unit, the second lens unit and the third lens unit satisfy the following condition:

$$0.10 < \Delta_{1G2G3G}/(f_t-f_w) < 0.77 \tag{13}$$

where $\Delta_{1G2G3G}$ is the sum of the absolute values of the displacements of the positions of the first lens unit, the second lens unit and the third lens unit at the wide angle end from the positions of the respective lens units at the wide angle end.

The movement amounts of the lens units as well as the thicknesses of the above-mentioned lens units tend to affect reduction in the size of the zoom lens at the time when the lens barrel is collapsed. Therefore, it is preferred, from the viewpoint of achieving good balance between size reduction at the time when the lens barrel is collapsed and optical performance, that conditional expression (13) concerning the movement amounts of the first lens unit, the second lens unit and the third lens unit during zooming relative to the change in the focal length during zooming be satisfied.

By designing the zoom lens in such a way that the lower limit of conditional expression (13) is not exceeded, the lens units have adequate movement amounts, and it becomes easy to make the refracting powers of the lens units small. This is advantageous in reducing spherical aberration and curvature of field.

By designing the zoom lens in such a way that the upper limit of conditional expression (13) is not exceeded, the movement amounts of the lens units during zooming relative to the change in the focal length can be made moderately small, thickness of the lens frame in the collapsed state can be made small, and the number of collapse steps can be reduced. This is advantageous in reducing the size.

It is preferred that the second lens unit is composed of two negative lenses and one positive lens.

Thus, to achieve an adequate zoom ratio, the negative refracting power of the second lens unit can be distributed to the two negative lenses, and aberrations can be cancelled by the one positive lens. This is advantageous in slimming the second lens unit and reducing variations in aberrations even though the second lens has a magnification changing function.

In this case, it is preferred that the second lens unit is composed, in order from the object side, of a first negative lens, a positive lens and a second negative lens.

Thus, the second lens unit has a symmetrical negative-positive-negative lens arrangement, which facilitates reduction of on-axis aberrations at telephoto positions that are likely to occur with a zoom lens having a high zoom ratio.

Furthermore, it is preferred that the image side surface of the first negative lens in the second lens unit be a concave surface, the object side surface of the second negative lens in the second lens unit be a concave surface and the image side surface of the positive lens in the second lens unit be a convex surface. This is advantageous in providing an adequate space for disposing the positive lens, which in turn is advantageous in reducing the thickness (or the length along the optical axis) of the second lens unit on and off the optical axis, in providing the second unit with an adequate refracting power and in achieving good optical performance.

It is preferred that the zoom lens be a four-unit zoom lens. By configuring the zoom lens as a four-unit zoom lens, load on a mechanism for driving the lens units can be made small.

It is also preferred that the zoom lens be provided with an iris stop disposed between the image side surface of the second lens unit and the image side surface of the third lens unit, and during zooming from the wide angle end to the telephoto end, the first lens unit move in such a way as to be located closer to the object side at the telephoto end than at the wide angle end, the second lens unit move, the third lens unit move in such a way as to be located closer to the object side at the telephoto end than at the wide angle end, the fourth lens unit move, and the iris stop move.

By moving these lens units, it becomes easy to reduce variations in aberrations with an increase in the zoom ratio and to arrange distribution of movement amounts of the lens units.

By moving the iris stop in such a way that it is located closer to the object side at the telephoto end than at the wide angle end, the size of the third lens unit can easily be made small, and it becomes preferably easy to provide an adequate degree of freedom in designing the movement ranges of the second lens unit and the third lens unit.

Furthermore, the movements of the respective lens unit during zooming from the wide angle end to the telephoto end may be designed as follows.

The first lens unit may be moved only toward the object side or along a locus that is convex toward the object side or the image side.

The second lens may be moved only toward the object side or along a locus that is convex toward the object side or the image side.

The third lens may be moved only toward the object side or along a locus that is convex toward the object side.

The rear lens unit may be moved in such a way as to be located closer to the object side or the image side at the telephoto end than at the wide angle end. It may be moved monotonously or along a locus that is convex toward the object side or the image side.

It is also preferred that the first lens unit have a negative lens and a positive lens. This facilitates reduction of chromatic aberration at zoom positions near the telephoto end that tends to be conspicuous when the zoom lens has a high zoom ratio.

Furthermore, if the first lens unit is configured to include a cemented lens having a negative lens and a positive lens, deterioration of the optical performance due to relative decentering of lenses caused by assembly errors can be prevented, which is conducive to improvement of the throughput and cost reduction.

The negative lens and the positive lens in the first lens unit may be independent lens components that are not cemented. In this case, it is possible to correct spherical aberration at the telephoto end more effectively.

Furthermore, by constituting the first lens unit by the two lenses (i.e. the negative lens and the positive lens), the lens unit can be made more compact with respect to the optical axis direction and the diametrical direction.

It is also preferred that the zoom lens satisfy the following conditions:

$$9 < f_t/f_w < 50 \tag{6}$$

where $f_w$ is the focal length of the entire zoom lens system at the wide angle end.

Conditional expression (6) relates to the ratio of the focal length of the entire zoom lens system at the wide angle end and that at the telephoto end.

It is preferred, in taking advantage of the above described features, that the zoom lens be designed to have such a high zoom ratio that the lower limit of conditional expression (6) is not exceeded.

By designing the zoom lens in such a way that the upper limit of conditional expression (6) is not exceeded, an increase in the number of lens units or an increase in the number of lenses required for providing appropriate optical performance can be easily prevented.

It is also preferred that the zoom lens satisfy the following conditions:

$$1.1 < L_t/L_w < 2.0 \quad (7)$$

where $L_t$ is the actual distance, on the optical axis, from the lens surface closest to the object side in the first lens unit to the image plane at the telephoto end, and $L_w$ is the actual distance, on the optical axis, from the lens surface closest to the object side in the first lens unit to the image plane at the wide angle end.

Conditional expression (7) relates to the ratio of the entire length of the zoom lens at the wide angle end and the entire length of the zoom lens at the telephoto end.

It is preferred that the zoom lens be designed in such a way that the lower limit of conditional expression (7) is not exceeded thereby reducing the entire length of the zoom lens at the wide angle end to achieve reduction in the size with respect to the diametrical direction and facilitating achievement of a high zoom ratio by designing the zoom lens in such a way as to have an adequate overall length at the telephoto end.

In the case where the image pickup apparatus is equipped with a flash unit, it is necessary to take care of vignetting or partial blocking of flash by the barrel of the zoom lens at the time of photographing at wide angle positions. By reducing the entire length of the zoom lens at the wide angle end, it becomes easy to reduce unevenness in brightness due to vignetting of flash without disposing the flash unit at a position far from the zoom lens. This is advantageous in reducing the overall size of the image pickup apparatus and in achieving an adequately wide angle of field at the wide angle end.

Designing the zoom lens in such a way that the upper limit of conditional expression (7) is not exceeded to thereby make variations in the entire length of the zoom lens small is advantageous in reducing the size of a lens frame for driving the zoom lens.

It is preferred that the first lens unit satisfy the following condition:

$$0.15 < f_1/f_t < 0.50 \quad (2)$$

where $f_1$ is the focal length of the first lens unit.

By increasing the refracting power of the first lens unit relative to the refracting power of the entire zoom lens system at the telephoto end, a further advantage in providing adequate magnification change by the second lens unit having a negative refracting power is achieved.

Conditional expression (2) regulates the refracting power of the first lens unit.

By designing the first lens unit in such a way that the lower limit of conditional expression (2) is not exceeded, it becomes easy to reduce the number of lenses required to reduce generation of aberrations (primarily, spherical aberration at the telephoto end) in the first lens unit. This is advantageous in making the size of the first lens unit smaller.

By designing the first lens unit in such a way that the upper limit of conditional expression (2) is not exceeded, it becomes easy to provide adequate magnification change by the second lens unit. This is advantageous in achieving a high zoom ratio while making the change in the distance between the first lens unit and the second lens unit small and in making the entire length of the zoom lens at the telephoto end smaller.

It is preferred that the second lens unit satisfy the following condition:

$$0.01 < |f_2|/f_t < 0.10 \quad (3)$$

where $f_2$ is the focal length of the second lens unit.

Conditional expression (3) specifies preferred refracting powers for the second lens unit from the viewpoint of achieving good balance between the compactness and optical performance.

By designing the second lens unit in such a way that the lower limit of conditional expression (3) is not exceeded, it becomes easy to suppress generation of spherical aberration and curvature of field in the second lens unit.

Designing the second lens unit in such a way that the upper limit of conditional expression (3) is not exceeded is advantageous in providing the second lens unit with an adequate magnification changing function and in reducing the size of the lens barrel with reduction in the entire length of the zoom lens.

It is preferred that the third lens unit satisfy the following condition:

$$0.01 < f_3/f_t < 0.10 \quad (1)$$

where $f_3$ is the focal length of the third lens unit.

By making the refracting power of the third lens unit relative to the refracting power of the entire zoom lens system at the telephoto end larger, it becomes easy to provide the rear side lens unit with an adequate positive refracting power at the wide angle end. This is advantageous in making the entire length of the zoom lens at the wide angle end shorter and in making he focal length at the wide angle end shorter.

Furthermore, displacing the third lens unit having a positive refracting power toward the object side is advantageous in providing the third lens unit with an adequate magnification changing function and in making the entire length of the zoom lens at the telephoto end shorter.

Conditional expression (1) regulates the refracting power of the third lens unit.

By designing the third lens unit in such a way that the lower limit of conditional expression (1) is not exceeded, it becomes easy to reduce the number of the lenses required to suppress generation of aberrations (primarily, spherical aberration) in the third lens unit. This is advantageous in reducing the size.

By designing the third lens unit in such a way that the upper limit of conditional expression (1) is not exceeded, it becomes easy to design the third lens unit in such a way as to provide adequate magnification change, which is advantageous in reducing the size and in increasing the zoom ratio.

It is preferred that the rear lens unit satisfy the following condition:

$$0.05 < f_{RL}/f_t < 0.30 \quad (14)$$

where $f_{RL}$ is the focal length of the rear lens unit at the wide angle end.

Conditional expression (14) specifies preferred positive refracting powers for the rear lens unit.

It is preferred that the rear lens unit be designed in such a way that the lower limit of conditional expression (14) is not exceeded to thereby prevent overcorrection of astigmatism. It is also preferred that the rear lens unit be designed in such a way that the upper limit of conditional expression (14) is not exceeded to thereby prevent under correction.

The rear lens unit located closest to the image side may be made of a plastic material. The principal role of the rear lens unit is to control the position of the exit pupil appropriately thereby causing rays to be incident on an image pickup element such as a CCD or CMOS sensor efficiently. To this end, the rear lens unit is not required to have a relatively high refracting power, so long as the refracting power falls within the range defined by conditional expression (14). Therefore, the rear lens unit may be a plastic lens made of a material having a relatively low refractive index. By using a plastic lens as the rear lens unit, the cost can be reduced, and it becomes possible to provide more inexpensive zoom lenses.

It is also preferred that the rear lens unit having a positive refracting power be moved in such a way as to be located closer to the image side at the telephoto end than at the wide angle end. By providing the rear lens unit with a magnification increasing function, the movement amounts of the lens units that move during zooming can be made smaller. This is advantageous in achieving both a sufficiently high zoom ratio and reduction in the size of the lens frame.

It is also preferred that the zoom lens satisfy the following condition at the telephoto end:

$$5.6 < F_t < 16.0 \quad (8)$$

where $F_t$ is the F-number of the zoom lens at the telephoto end or the minimum F-number in the case where the F-number is variable.

Conditional expression (8) regulates the F-number at the telephoto end.

Designing the zoom lens in such a way that the lower limit of conditional expression (8) is not exceeded is advantageous in reducing influences of spherical aberration and chromatic aberration of magnification that tend to be conspicuous when the zoom lens has a high zoom ratio. This is also advantageous in reducing the size of each lens unit.

By designing the zoom lens in such a way that the upper limit of conditional expression (8) is not exceeded, influences of hand vibration that tend to be conspicuous when the zoom lens has a high zoom ratio can be made smaller, which allows a mechanism for vibration reduction and/or image processing for blur correction to be made simple and easy.

It is also preferred that the first lens unit and the second lens unit satisfy the following condition in relation to each other:

$$1.26 < \Sigma D1/\Sigma D2 < 3.00 \quad (15)$$

where $\Sigma D1$ is the thickness of the first lens unit on the optical axis, and $\Sigma D2$ is the thickness of the second lens unit on the optical axis, the thickness of each lens unit on the optical axis referring to the actual distance from the object side surface of the lens located closest to the object side in the lens unit to the image side surface of the lens located closest to the image side in the lens unit.

Conditional expression (15) specifies preferred ratios of the thickness of the first lens unit to the thickness of the second lens unit.

To achieve a large angle of field at the wide angle end and a high zoom ratio, it is preferred that spherical aberration at zoom positions near the telephoto end and curvature of field at zoom positions near the wide angle end be corrected excellently.

Designing the zoom lens in such a way that the lower limit of conditional expression (15) is not exceeded so as to make the thickness of the second lens unit appropriately small and make the thickness of the first lens unit on the optical axis appropriately large is advantageous in providing the first lens unit with an adequate refracting power, achieving an adequate effective diameter at the wide angle end while achieving a wide angle of field, correcting spherical aberration at zoom positions near the telephoto end and correcting curvature of field at zoom positions near the wide angle end.

Designing the zoom lens in such a way that the upper limit of conditional expression (15) is not exceeded so as to prevent the first lens unit from becoming large is advantageous in reducing the size. Alternatively, the second lens unit may be designed to have an appropriately large thickness, which makes it easy to provide the second lens unit with an adequate refracting power and achieve adequate optical performance.

It is preferred that every lens unit included in the zoom lens have an aspheric lens surface. If this is the case, influence of aberrations in the zoom lens having a high zoom ratio can be reduced in each lens unit, which is advantageous in, for example, reducing the total number of lenses included in the zoom lens.

It is preferred that the total number of lenses included in the zoom lens be in the range of 8 to 12, each of the first and third lens units have a negative lens and a positive lens, and the second lens unit have a positive lens and a plurality of negative lenses.

Having 8, 9, 10, 11 or 12 lenses in total is advantageous in reducing variations in aberrations associated with a high zoom ratio, in reducing the size of the zoom lens at the time when the lens barrel is collapsed and in reducing the cost.

Having both a positive lens and a negative lens in each of the first, second and third lens units is advantageous in reducing generation of aberrations in each lens unit. Having a plurality of negative lenses in the second lens unit enables the second lens unit to have an adequate refracting power while suppressing influences of aberrations, which is advantageous in reducing the size and in achieving a high zoom ratio.

An image pickup apparatus according to the present invention comprises at least any one of the above described zoom lenses, and an image pickup element disposed on the image side of the zoom lens that converts an image formed by the zoom lens into an electrical signal.

Having a zoom lens that can advantageously achieve a high zoom ratio and be collapsed when not in use is advantageous in reducing the size of the image pickup apparatus.

It is preferred that the image pickup apparatus is further equipped with a flash unit.

It is also preferred that the image pickup apparatus be provided with an image processing section that performs signal processing for correcting aberrations contained in the electrical signal.

This is advantageous in further reducing the size and increasing the zoom ratio, since aberrations (e.g. distortion and chromatic aberration of magnification) of the zoom lens are allowed to be generated.

Furthermore, it is preferred that the following condition be satisfied:

$$0.05 < IH_w/f_w < 1.00 \quad (9)$$

where $IH_w$ is the maximum image height at the wide angle end, and $f_w$ is the focal length of the entire zoom lens system at the wide angle end.

Conditional expression (9) specifies preferred relationship between the focal length and the maximum image height at the wide angle end.

It is preferred that the lower limit of conditional expression (9) be not exceeded to advantageously achieve an adequately large angle of field at the wide angle end.

It is preferred that the upper limit of conditional expression (9) be not exceeded to facilitate reduction of the size of the first and second lens units with respect to the diametrical direction.

In the above described embodiments, the lens unit located closest to the image side may be made of a plastic material. The principal role of the lens unit located closest to the image side is to control the position of the exit pupil appropriately thereby causing rays to be incident on an image pickup element such as a CCD or CMOS sensor efficiently. To this end, the lens unit located closest to the image side is not required to have a relatively high refracting power. Therefore, the lens unit located closest to the image side may be a plastic lens made of a material having a relatively low refractive index. By this feature the cost can be reduced, and it becomes possible to provide more inexpensive zoom lenses and image pickup apparatuses.

It is preferred that an iris stop and a shutter be located between the second lens unit and the third lens unit, and the iris stop and the shutter be moved integrally with the third lens unit during zooming. By this feature, the entrance pupil can be located at a position near the object side and the exit pupil can be located far from the image plane. In addition, since the shutter unit is located at a position at which the height of off-axis rays is low, a large-size shutter unit is not required and the dead space associated with the movement of the iris stop and the shutter unit can be made small.

By moving all the lens units, it is possible to effectively provide all the lens units with magnification changing functions, and high performance can be achieved even with a zoom lens having a large angle of field and a high zoom ratio.

By moving the iris stop, effective correction of spherical aberration can be achieved, which not only is effective in improving the performance but also enables appropriate control of the position of the entrance pupil and the position of the exit pupil. This means that the height of off-axis rays at the wide angle end and the height of off-axis rays at the telephoto end can be well balanced, and the outer diameter of the first lens unit and the outer diameter of the lens unit closes to the image side can be made small with good balance. In particular, a reduction of the outer diameter of the first lens unit at the wide angle end effectively leads also to a reduction in the size of the lens with respect to the thickness direction (i.e. the direction along the optical axis) Furthermore, variations in the position of the exit pupil during zooming can be controlled or made small. Thus, the incidence angle of rays on a CCD or a CMOS sensor etc. can be kept within an appropriate range, and therefore shading in the regions near the corners of the image area can be easily prevented from occurring.

Furthermore, in order to cut or block unwanted light such as ghost and flare, a flare stop may be provided in addition to the iris stop. The flare stop may be disposed on the object side of the first lens unit, between the first lens unit and the second lens unit, between the second lens unit and the third lens unit, between the third lens unit and the fourth lens unit (or the rear lens unit) or between the fourth lens unit (or the rear lens unit) and the image plane. A frame member that holds a lens maybe designed to serve as the flare stop. Alternatively, a separate flare stop member may be provided. The flare stop may be formed on a lens surface of any one of the lenses in the zoom lens by direct printing, coating or by sticking a sheet. The opening of the flare stop may have various shapes such as circular, elliptical, rectangular, or polygonal shape, or the opening shape may be defined by a curve specified by a mathematical function. The flare stop may cut not only detrimental beams but also beams that may cause coma flare in the peripheral regions of the image.

Anti-reflection coating may be applied on each of the lenses to reduce ghost and flare. Multi-coating is preferable, since effective ghost and flare reduction can be expected.

Furthermore, infrared cut coating may be applied on a lens surface or on a surface of a cover glass etc.

It is preferred that focusing be performed by moving the fourth lens unit (or the rear lens unit).

When focusing is performed by moving the fourth lens unit (or the rear lens unit), load on the motor will be small, since the fourth lens unit (or the rear lens unit) is light in weight. This also makes it easier to suppress changes in the angle of field with focusing operation.

Furthermore, this is advantageous in making the lens frame compact, since the entire length of the zoom lens does not change with focusing and a drive motor can be provided inside the lens frame.

Although it is preferred that focusing be performed by the fourth lens unit (or the rear lens unit) as described above, focusing may be performed by the first, second or third lens unit. Alternatively, focusing may be performed by moving a plurality of lens units. Alternatively, focusing may be performed by moving the zoom lens as a whole. Alternatively, focusing may be performed by shifting a part of the lenses forward or backward.

Shading in the peripheral regions of the image may be reduced by shifting microlenses corresponding to individual light receiving pixels on the light receiving surface of the image pickup element. For example, design of microlenses may be varied in accordance with the incidence angle of rays at the corresponding image height. A decrease in the brightness or light quantity in the peripheral regions of the image may be compensated by image processing.

In the case where the zoom lens has a focusing function, the conditional expressions presented above should be interpreted as conditions in the state in which the zoom lens is focused on the farthest object point.

It is more preferred that some of the above described features be adopted in combination.

It is preferred that the image pickup apparatus have an image transformation section that transforms, by image processing, an electrical signal containing a distortion due to the zoom lens into an image signal in which the distortion is corrected. This is advantageous in further reducing the size and the number of lenses in the zoom lens, since distortion of the image formed by the zoom lens is allowed.

In the case where the zoom lens has a focusing function, the conditional expressions presented above should be interpreted as conditions in the state in which the zoom lens is focused on the farthest object point.

It is more preferred that some of the above described features be adopted in combination.

It is more preferred that the limit values in the conditional expressions be changed as follows.

As to conditional expression (1), it is more preferred that the lower limit value be 0.05, more preferably 0.09. It is more preferred that the upper limit value be 0.13, more preferably 0.12.

As to conditional expression (2), it is more preferred that the lower limit value be 0.20, more preferably 0.25. It is more preferred that the upper limit value be 0.45, more preferably 0.38, and still more preferably 0.35.

As to conditional expression (3), it is more preferred that the lower limit value be 0.02, more preferably 0.045. It is more preferred that the upper limit value be 0.075, more preferably 0.06.

As to conditional expression (4), it is more preferred that the lower limit value be 1.30, more preferably 1.40. It is more preferred that the upper limit value be 2.50, more preferably 2.00.

As to conditional expression (5), it is more preferred that the lower limit value be 0.09. It is more preferred that the upper limit value be 0.20.

As to conditional expression (6), it is more preferred that the lower limit value be 15, more preferably 18. It is more preferred that the upper limit value be 40, more preferably 30.

As to conditional expression (7), it is more preferred that the lower limit value be 1.2, more preferably 1.5. It is more preferred that the upper limit value be 1.8, more preferably 1.7.

As to conditional expression (8), it is more preferred that the lower limit value be 7.0. It is more preferred that the upper limit value be 14.0, more preferably 11.2.

As to conditional expression (9), it is more preferred that the lower limit value be 0.60, more preferably 0.70. It is more preferred that the upper limit value be 0.95, more preferably 0.85.

It is more preferred that limit values in the conditional expressions be changed as follows.

As to conditional expression (10), it is more preferred that the lower limit value be 0.15, more preferably 0.18. It is more preferred that the upper limit value be 0.27, more preferably 0.26.

As to conditional expression (11), it is more preferred that the lower limit value be 0.10, more preferably 0.12. It is more preferred that the upper limit value be 0.17, more preferably 0.15.

As to conditional expression (12), it is more preferred that the lower limit value be 0.03, more preferably 0.04. It is more preferred that the upper limit value be 0.07, more preferably 0.06, and still more preferably 0.055.

As to conditional expression (13), it is more preferred that the lower limit value be 0.30, more preferably 0.50. It is more preferred that the upper limit value be 0.73, more preferably 0.70.

As to conditional expression (14), it is more preferred that the lower limit value be 0.09. It is more preferred that the upper limit value be 0.20.

As to conditional expression (15), it is more preferred that the lower limit value be 1.30, more preferably 1.40. It is more preferred that the upper limit value be 2.50, more preferably 2.00.

In the above-described modes of the invention, it is more preferred that some of the conditions be satisfied simultaneously. In the more preferred numerical range limitations by each of the conditional expressions presented above, limitation by only the upper limit value or the lower limit value may be applied. Furthermore, the various features described above may be adopted in any possible combination.

It is preferred, from the viewpoint of aberration correction, that the total number of lenses included in the zoom lens be 9 or more.

It is preferred, in order to achieve reduction in the size and cost, that the total number of lenses included in the zoom lens be 11 or less, more preferably 10 or less.

In the above-described modes of the invention, it is more preferred that some of the conditions be satisfied simultaneously. In the more preferred numerical range limitations by each of the conditional expressions presented above, limitation by only the upper limit value or the lower limit value may be applied. Furthermore, the various features described above may be adopted in any possible combination.

In the following, some exemplary zoom lenses as embodiments of the present invention will be described. These zoom lenses are small in size while having a high zoom ratio and a wide angle of field to meet the demands of users who wish to use a zoom lens in extended shooting situations without losing portability thereof. The zoom lenses according to the embodiments are inexpensive zoom lenses that provide good image quality and are suitable for use with an electronic image pickup element such as a CCD or CMOS sensor.

In the following, embodiments of the zoom lens and the image pickup apparatus according to the present invention will be described in detail with reference to the drawings. It should be understood, however, that the embodiments are not intended to limit the present invention.

In the zoom lenses according to the first to third embodiments, the effective image pickup area has a rectangular shape constantly at all the zoom positions. The values associated with conditional expressions presented below for each embodiment are for the state in which the zoom lens is focused on an object point at infinity.

In the embodiments, focusing is performed by moving the fourth lens unit, and focusing operation from an object point at a long distance to an object point at a short distance is performed by moving the fourth lens unit toward the object side.

Plane parallel plates include a low pass filter having IR cut coating applied thereon and a CCD cover glass. In the case where there is only one plane parallel plate, it is a CCD cover glass. In the case where the number of pixels is large, moire is not conspicuous even without a low pass filter. The IR cut coating may be applied on a lens surface or the surface of the cover glass. A shutter is provided at a position near the stop (iris stop) indicated in the lens data, though the shutter is not indicated in the numerical data. Alternatively, the same member may serve as both the shutter and the stop.

In the following, the first to third embodiments of the zoom lens according to the present invention will be described. FIGS. 1A to 1E, 2A to 2E and 3A to 3E are cross sectional views showing the configurations of the zoom lenses according to the first to third embodiments at the wide angle end, in a first intermediate focal length state, in a second intermediate focal length state, in a third intermediate focal length state and at the telephoto end in the state in which the zoom lens is focused on an object point at infinity. In FIGS. 1A through 3E, the first lens unit is denoted by G1, the second lens unit is denoted by G2, the iris stop (or aperture stop) is denoted by S, the third lens unit is denoted by G3, the fourth lens unit is denoted by G4, a plane parallel plate having wavelength range restriction coating applied thereon that blocks or reduces infrared light to constitute the low pass filter as described above is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

The front side lens unit includes the first lens unit G1 and the second lens unit G2. The rear side lens unit includes the third lens unit G3 and the fourth lens unit G4 (which corresponds to the rear lens unit).

All the numerical data presented below are for the state in which the zoom lens is focused on an object at infinity. In the numerical data, dimensions are in mm and angles are in degrees. The zoom data are presented for the wide angle end (WE), the first intermediate focal length state (ST1), the second intermediate focal length state (ST2), the third intermediate focal length state (ST3) and telephoto end (TE) As shown in FIGS. 1A to 1E, the zoom lens according to the first embodiment has a first lens unit G1 having a positive refracting power, a second lens unit G2 having a negative refracting power, an iris stop S, a third lens unit G3 having a positive refracting power and a fourth lens unit G4 having a positive refracting power, which are arranged in the mentioned order from the object side.

During zooming from the wide angle end to the telephoto end, the first lens unit G1 moves only toward the object side, the second lens unit G2 moves only toward the object side, the third lens unit G3 moves only toward the object side, and the fourth lens unit G4 moves along a locus that is convex toward the image side.

The first lens unit G1 is composed, in order from the object side, of a cemented lens composed of a negative meniscus lens having a convex surface directed toward the object side and a positive meniscus lens having a convex surface directed toward the object side, and a positive meniscus lens having a convex surface directed toward the object side. The second lens unit G2 is composed, in order from the object side, of a negative meniscus lens having a convex surface directed toward the object side and a cemented lens composed of a biconvex positive lens and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the positive meniscus lens having a convex surface directed toward the object side located closest to the image side in the first lens unit G1, both the side surfaces of the negative meniscus lens having a convex surface directed toward the object side in the second lens unit G2, the image side surface of the biconcave negative lens located on the image side in the second lens unit G2, both the side surfaces of the biconvex positive lens in the third lens unit G3 and both the side surfaces of the biconvex positive lens in the fourth lens unit G4, namely there are eight aspheric surfaces in total.

As shown in FIGS. 2A to 2E, the zoom lens according to the second embodiment has a first lens unit G1 having a positive refracting power, a second lens unit G2 having a negative refracting power, an iris stop S, a third lens unit G3 having a positive refracting power and a fourth lens unit G4 having a positive refracting power, which are arranged in the mentioned order from the object side.

During zooming from the wide angle end to the telephoto end, the first lens unit G1 moves only toward the object side, the second lens unit G2 moves only toward the object side, the third lens unit G3 moves only toward the object side, and the fourth lens unit G4 moves along a locus that is convex toward the image side.

The first lens unit G1 is composed, in order from the object side, of a cemented lens composed of a negative meniscus lens having a convex surface directed toward the object side and a positive meniscus lens having a convex surface directed toward the object side, and a biconvex positive lens. The second lens unit G2 is composed, in order from the object side, of a negative meniscus lens having a convex surface directed toward the object side and a cemented lens composed of a biconvex positive lens and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the positive meniscus lens having a convex surface directed toward the object side located on the image side in the first lens unit G1, both the side surfaces of the negative meniscus lens having a convex surface directed toward the object side in the second lens unit G2, the image side surface of the biconcave negative lens in the second lens unit G2, both the side surfaces of the biconvex positive lens in the third lens unit G3 and both the side surfaces of the biconvex positive lens in the fourth lens unit G4, namely there are eight aspheric surfaces in total.

As shown in FIGS. 3A to 3E, the zoom lens according to the third embodiment has a first lens unit G1 having a positive refracting power, a second lens unit G2 having a negative refracting power, an iris stop S, a third lens unit G3 having a positive refracting power and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, the third lens unit G3 moves only toward the object side, and the fourth lens unit G4 moves first toward the image side and thereafter reverses its movement direction twice.

The first lens unit G1 is composed, in order from the object side, of a negative meniscus lens having a convex surface directed toward the object side and a biconvex positive lens. The second lens unit G2 is composed, in order from the object side, of a negative meniscus lens having a convex surface directed toward the object side and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both the side surfaces of the negative meniscus lens having a convex surface directed toward the object side in the second lens unit G2, the image side surface of the biconcave negative lens in the second lens unit G2, both the side surfaces of the biconvex positive lens in third lens unit G3 and both the side surfaces of the biconvex positive lens in the fourth lens unit G4, namely there are eight aspheric surfaces in total.

Numerical data of each embodiment described above is shown below. Apart from symbols described above, f denotes a focal length of the entire zoom lens system, $F_{NO}$ denotes an F number, $\omega$ denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1 unit mm

Surface data

| Surface No | r | d | nd | νd |
|---|---|---|---|---|
| 1 | 71.917 | 0.80 | 1.92286 | 18.90 |
| 2 | 37.529 | 4.00 | 1.61800 | 63.33 |
| 3 | 138.659 | 0.10 | | |
| 4 | 26.623 | 5.50 | 1.77250 | 49.60 |
| 5* | 192621.886 | Variable | | |
| 6* | 47.954 | 0.80 | 1.83481 | 42.71 |
| 7* | 6.341 | 2.50 | | |
| 8 | 118.332 | 1.60 | 1.94595 | 17.98 |
| 9 | −10.823 | 0.80 | 1.83481 | 42.71 |
| 10* | 14.081 | Variable | | |
| 11(S) | ∞ | 0.30 | | |
| 12* | 5.438 | 2.96 | 1.49700 | 81.54 |
| 13* | −20.223 | 0.10 | | |
| 14 | 6.668 | 1.50 | 1.77250 | 49.60 |
| 15 | 11.000 | 0.70 | 1.84666 | 23.78 |
| 16 | 3.966 | Variable | | |
| 17* | 31.214 | 1.90 | 1.74330 | 49.33 |
| 18* | −9.711 | Variable | | |
| 19 | ∞ | 0.40 | 1.54771 | 62.84 |
| 20 | ∞ | 0.50 | | |
| 21 | ∞ | 0.50 | 1.51633 | 64.14 |
| 22 | ∞ | 0.37 | | |
| Image plane (Light receiving surface) | | | | |

Aspherical coefficients

1th surface
5th surface k = 0.654, A4 = 4.76005e−06, A6 = −5.27460e−10,
A8 = −8.76612e−12, A10 = 1.17810e−14
6th surface k = 0.000, A4 = −2.34324e−04, A6 = −3.13708e−06,
A8 = 2.43681e−07, A10 = −2.99207e−09
7th surface k = 0.369, A4 = 1.12943e−04, A6 = 1.11887e−05,
A8 = −1.27867e−06, A10 = 4.22626e−08
10th surface k = 0.000, A4 = −9.38012e−04, A6 = −1.97637e−05,
A8 = 2.81611e−06, A10 = −1.02669e−07
12th surface k = 0.000, A4 = −5.69400e−04, A6 = 1.16631e−05,
A8 = −1.28093e−06, A10 = 4.10229e−07
13th surface k = 0.000, A4 = 8.40292e−04, A6 = 3.86549e−05,
A8 = −4.12799e−06, A10 = 8.33733e−07
17th surface k = 0.772, A4 = −2.37726e−04, A6 = 1.50005e−05,
A8 = −2.25542e−07, A10 = 6.46375e−10
18th surface k = 0.000, A4 = 9.09060e−05, A6 = 1.72680e−05,
A8 = −2.44150e−07

Zoom data

| | WE | ST1 | ST2 | ST3 | TE |
|---|---|---|---|---|---|
| focal length | 4.85 | 10.51 | 19.35 | 47.08 | 100.00 |
| Fno. | 8.00 | 8.00 | 8.00 | 8.00 | 8.00 |
| 2ω(°) | 80.53 | 37.80 | 21.98 | 9.85 | 4.60 |
| BF | 5.68 | 4.90 | 4.41 | 1.76 | 2.46 |
| Total length | 48.06 | 59.63 | 65.78 | 70.32 | 74.55 |
| d5 | 0.20 | 10.00 | 15.08 | 18.40 | 20.19 |
| d10 | 12.73 | 10.77 | 9.35 | 7.23 | 1.00 |
| d16 | 5.89 | 10.41 | 13.38 | 19.37 | 27.34 |
| d18 | 4.23 | 3.44 | 2.95 | 0.30 | 1.00 |

EXAMPLE 2 unit mm

Surface data

| Surface No | r | d | nd | νd |
|---|---|---|---|---|
| 1 | 62.968 | 0.80 | 1.92286 | 18.90 |
| 2 | 34.496 | 3.50 | 1.61800 | 63.33 |
| 3 | 155.107 | 0.10 | | |
| 4 | 29.363 | 4.00 | 1.77250 | 49.60 |
| 5* | −3588.280 | Variable | | |
| 6* | 59.714 | 0.80 | 1.83481 | 42.71 |
| 7* | 6.851 | 2.50 | | |
| 8 | 190.030 | 1.60 | 1.94595 | 17.98 |
| 9 | −10.823 | 0.80 | 1.83481 | 42.71 |
| 10* | 14.854 | Variable | | |
| 11(S) | ∞ | 0.30 | | |
| 12* | 5.209 | 2.30 | 1.49700 | 81.54 |
| 13* | −15.384 | 0.10 | | |
| 14 | 6.338 | 1.50 | 1.77250 | 49.60 |
| 15 | 8.181 | 0.70 | 1.90000 | 23.80 |
| 16 | 3.690 | Variable | | |
| 17* | 39.261 | 1.90 | 1.74330 | 49.33 |
| 18* | −10.366 | Variable | | |
| 19 | ∞ | 0.50 | 1.51633 | 64.14 |
| 20 | ∞ | 0.77 | | |
| Image plane (Light receiving surface) | | | | |

Aspherical coefficients

5th surface k = 0.654, A4 = 2.62061e−06, A6 = 2.58535e−09,
A8 = −1.90250e−11, A10 = 3.54790e−14
6th surface k = 0.000, A4 = −2.25942e−04, A6 = −2.43816e−06,
A8 = 2.41139e−07, A10 = −3.04832e−09
7th surface k = 0.736, A4 = 8.01450e−05, A6 = 1.05151e−05,
A8 = −1.27831e−06, A10 = 4.22643e−08
10th surface k = 0.000, A4 = −8.43392e−04, A6 = −2.02943e−05,
A8 = 2.81754e−06, A10 = −1.02665e−07
12th surface k = 0.000, A4 = −6.79145e−04, A6 = 1.27390e−05,
A8 = −1.28037e−06, A10 = 4.10229e−07
13th surface k = 0.000, A4 = 8.06000e−04, A6 = 3.79038e−05,
A8 = −4.12831e−06, A10 = 8.33733e−07
17th surface k = 0.206, A4 = −1.30715e−04, A6 = 1.46119e−05,
A8 = −2.28610e−07, A10 = 6.27096e−10

-continued

18th surface k = 0.000, A4 = 9.09060e−05, A6 = 1.76840e−05,
A8 = −2.41180e−07

Zoom data

|  | WE | ST1 | ST2 | ST3 | TE |
|---|---|---|---|---|---|
| focal length | 4.64 | 9.70 | 18.11 | 47.11 | 85.12 |
| Fno. | 8.00 | 8.00 | 8.00 | 8.00 | 8.00 |
| 2ω(°) | 85.45 | 40.52 | 22.84 | 9.50 | 5.15 |
| BF | 5.46 | 4.52 | 3.90 | 1.15 | 2.75 |
| Total length | 43.70 | 54.19 | 60.86 | 67.07 | 71.338 |
| d5 | 0.20 | 8.87 | 14.21 | 18.10 | 20.67 |
| d10 | 12.77 | 10.46 | 8.59 | 5.72 | 1.00 |
| d16 | 4.37 | 9.44 | 13.25 | 21.20 | 26.01 |
| d18 | 4.36 | 3.42 | 2.80 | 0.05 | 1.65 |

EXAMPLE 3 unit mm

Surface data

| Surface No | r | d | nd | vd |
|---|---|---|---|---|
| 1 | 47.985 | 0.80 | 1.92286 | 18.90 |
| 2 | 28.243 | 0.05 | | |
| 3 | 21.248 | 4.08 | 1.77250 | 49.60 |
| 4* | −116.425 | Variable | | |
| 5* | 165.072 | 0.80 | 1.83481 | 42.71 |
| 6* | 7.304 | 2.03 | | |
| 7 | −91.810 | 1.91 | 1.94595 | 17.98 |
| 8 | −10.823 | 0.80 | 1.83481 | 42.71 |
| 9* | 17.995 | Variable | | |
| 10(S) | ∞ | 0.30 | | |
| 11* | 5.280 | 2.46 | 1.49700 | 81.54 |
| 12* | −14.512 | 0.28 | | |
| 13 | 6.294 | 1.52 | 1.77250 | 49.60 |
| 14 | 8.181 | 0.80 | 2.00068 | 25.47 |
| 15 | 3.729 | Variable | | |
| 16* | 473.250 | 3.74 | 1.74330 | 49.33 |
| 17* | −11.842 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane (Light receiving surface) | | | | |

Aspherical coefficients

4th surface k = 0.654, A4 = 1.17011e−05, A6 = −1.96762e−09,
A8 = −8.17022e−12, A10 = 5.12387e−15

5th surface k = 0.000, A4 = −8.24711e−05, A6 = −2.76503e−06,
A8 = 2.27122e−07, A10 = −3.15083e−09

6th surface k = 0.787, A4 = 6.34033e−05, A6 = 1.04135e−05,
A8 = −1.27967e−06, A10 = 4.22656e−08

9th surface k = 0.000, A4 = −5.37026e−04, A6 = −1.90025e−05,
A8 = 2.82021e−06, A10 = −1.02639e−07

11th surface k = 0.000, A4 = −4.84682e−04, A6 = 1.18845e−05,
A8 = −1.28144e−06, A10 = 4.10225e−07

-continued

12th surface k = 0.000, A4 = 8.84774e−04, A6 = 3.84287e−05,
A8 = −4.12823e−06, A10 = 8.33734e−07

16th surface k = 0.000, A4 = 9.93673e−21, A6 = 1.56889e−05,
A8 = −2.27236e−07, A10 = 6.31860e−10

17th surface k = 0.000, A4 = 9.09060e−05, A6 = 1.67850e−05,
A8 = −2.42650e−07

Zoom data

|  | WE | ST1 | ST2 | ST3 | TE |
|---|---|---|---|---|---|
| focal length | 4.84 | 9.46 | 19.43 | 38.31 | 100.77 |
| Fno. | 3.60 | 4.82 | 5.12 | 5.60 | 8.16 |
| 2ω(°) | 84.84 | 44.20 | 22.40 | 11.52 | 4.50 |
| BF | 5.74 | 5.42 | 4.57 | 6.55 | 2.64 |
| Total length | 43.66 | 50.40 | 59.78 | 67.75 | 69.21 |
| d4 | 0.06 | 5.04 | 11.53 | 16.83 | 21.12 |
| d9 | 14.64 | 10.80 | 8.50 | 5.21 | 1.27 |
| d15 | 3.65 | 9.57 | 15.61 | 19.60 | 24.62 |
| d17 | 4.28 | 3.96 | 3.11 | 5.09 | 1.18 |

In fourth to sixth embodiments, the zoom lenses according to the first to third embodiments are respectively used in an image pickup apparatus that has a function of correcting distortion electrically, wherein the shape of the effective image pickup area is changed upon zooming. Therefore, in the thirteenth to fourth to sixth embodiments, the image height and the angle of field at a zoom position are different from those in the respective corresponding embodiments.

In the fourth to sixth embodiments, barrel distortion (hat shaped) that occurs at wide angle positions is corrected electrically, and a thus-corrected image is recorded or displayed.

In the zoom lenses according to the embodiments, barrel occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

In the fourth to sixth embodiments, the effective image pickup area is designed in such a way that the effective image pickup area at the wide angle end has a dimension in the shorter side direction equal to the dimension in the shorter side direction of the photoelectric conversion surface, and a distortion of approximately −3% remains after image processing.

At an angle of field of 28 mm in 135 mm film size, it is preferable that a distortion of approximately −3% remains in consideration of balance between an influence of perspective at a time of image taking for three-dimensional object and an influence of barrel shape distortion.

As a matter of course, a barrel shaped area smaller than that described above may be set as the effective image pickup area, and image resulting from transformation of this area into a rectangular area may be recorded/reproduced.

The zoom lens used in the fourth embodiment is the same as the zoom lens according to the first embodiment.

The zoom lens used in the fifth embodiment is the same as the zoom lens according to the second embodiment.

The zoom lens used in the sixth embodiment is the same as the zoom lens according to the third embodiment.

Data of image height and total image angle in example 4 are as shown below.

| Zoom data | | | | | |
|---|---|---|---|---|---|
| | WE | ST1 | ST2 | ST3 | TE |
| focal length | 4.85 | 19.35 | 100.00 | 10.51 | 47.08 |
| Fno. | 8.00 | 8.00 | 8.00 | 8.00 | 8.00 |
| 2ω(°) | 80.12 | 37.80 | 21.98 | 9.85 | 4.60 |
| Total length | 3.847 | 3.88 | 3.88 | 3.88 | 3.88 |

Data of image height and total image angle in example 5 are as shown below.

| Zoom data | | | | | |
|---|---|---|---|---|---|
| | WE | ST1 | ST2 | ST3 | TE |
| focal length | 4.64 | 18.11 | 85.12 | 9.70 | 47.11 |
| Fno. | 8.00 | 8.00 | 8.00 | 8.00 | 8.00 |
| 2ω(°) | 82.846 | 40.518 | 22.838 | 9.502 | 5.146 |
| Total length | 3.60 | 3.80 | 3.80 | 3.80 | 3.80 |

Data of image height and total image angle in example 6 are as shown below.

| Zoom data | | | | | |
|---|---|---|---|---|---|
| | WE | ST1 | ST2 | ST3 | TE |
| focal length | 4.84 | 9.46 | 19.43 | 38.31 | 100.77 |
| Fno. | 3.60 | 4.82 | 5.12 | 5.60 | 8.16 |
| 2ω(°) | 82.078 | 44.200 | 22.400 | 11.518 | 4.498 |
| Total length | 3.69 | 3.88 | 3.88 | 3.88 | 3.88 |

Aberration diagrams of the zoom lenses according to the first to third embodiments in the state in which the zoom lenses are focused on an object point at infinity are shown in FIGS. 4A to 9E.

Figure 4A:
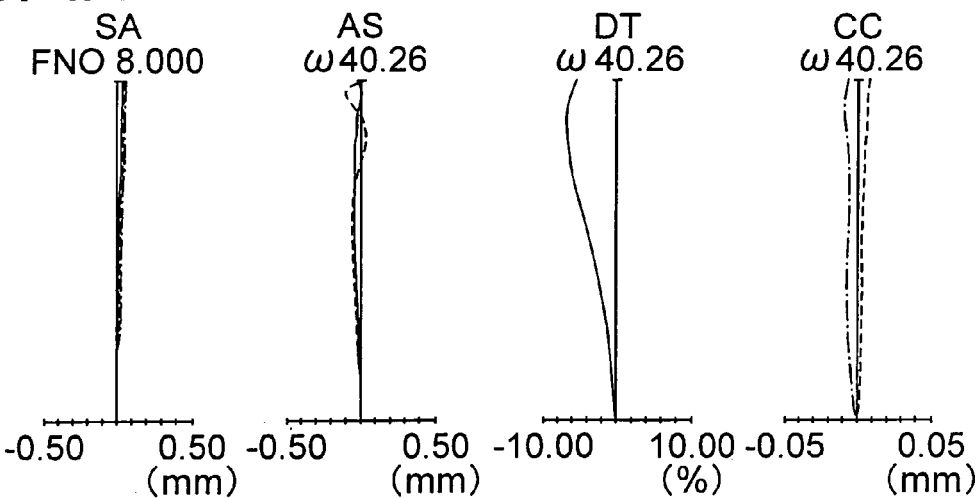
FIGS. 4A, 4B and 4C are diagrams showing spherical aberration, astigmatism, distortion and chromatic aberration of magnification in the first embodiment in the state in which the zoom lens is focused on an object point at infinity, where
Figure 6A:
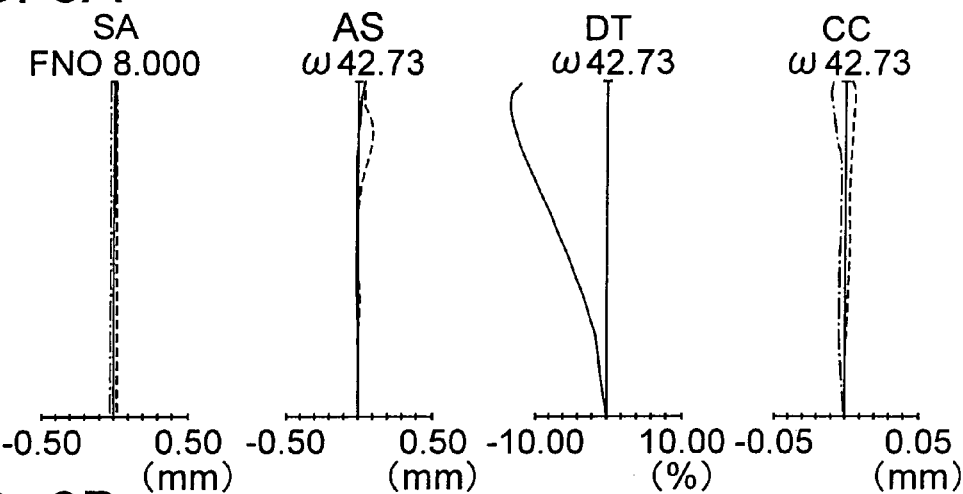
FIGS. 6A, 6B and 6C are diagrams similar to FIGS. 4A, 4B and 4C showing aberrations in the second embodiment in the state in which the zoom lens is focused on an object point at infinity.
Figure 8A:
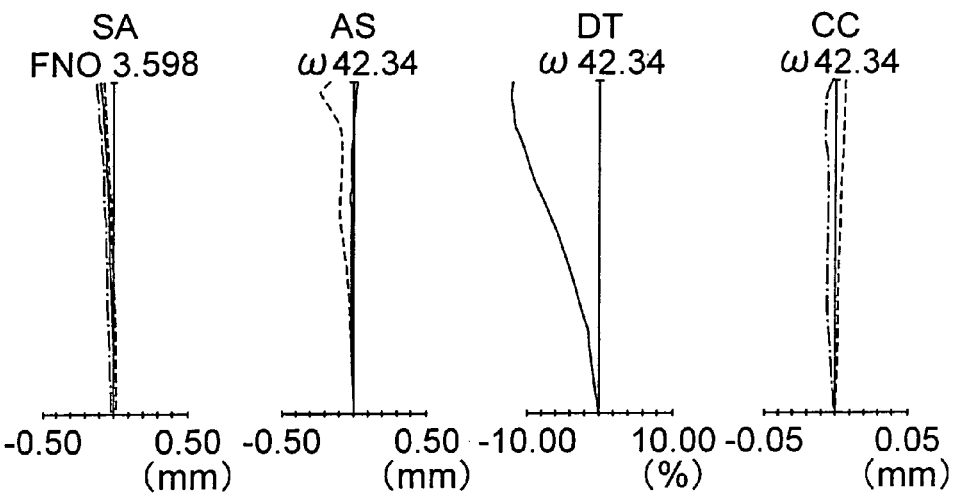
FIGS. 8A, 8B and 8C are diagrams similar to FIGS. 4A, 4B and 4C showing aberrations in the third embodiment in the state in which the zoom lens is focused on an object point at infinity.

FIGS. 4A, 6A, and 8A show spherical aberration (SA), astigmatism (AS), distortion (DT) and chromatic aberration of magnification (CC) at the wide angle end.

Figure 4B:
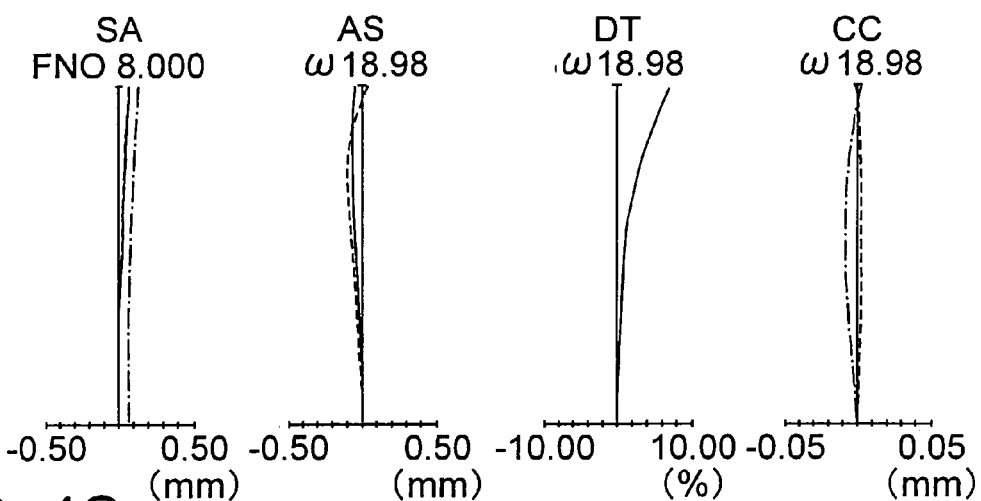
Figure 6B:
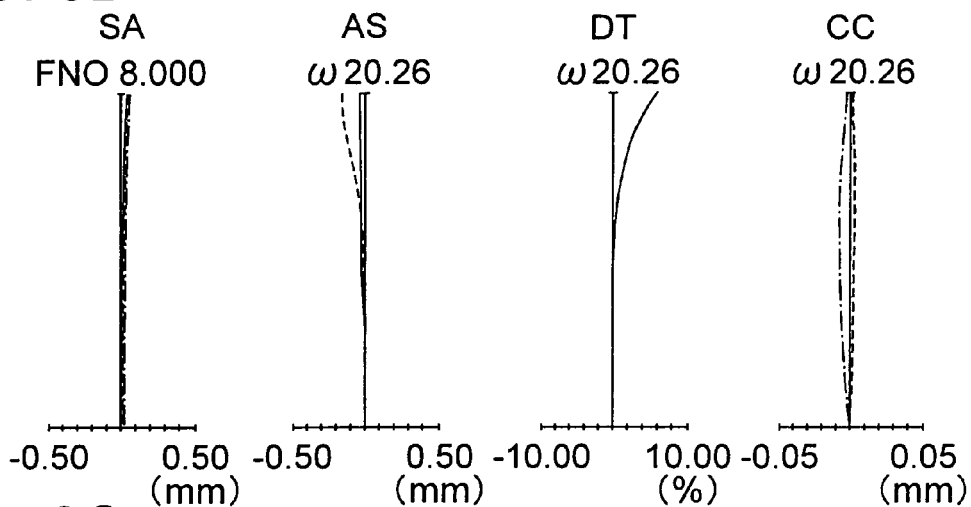
Figure 8B:
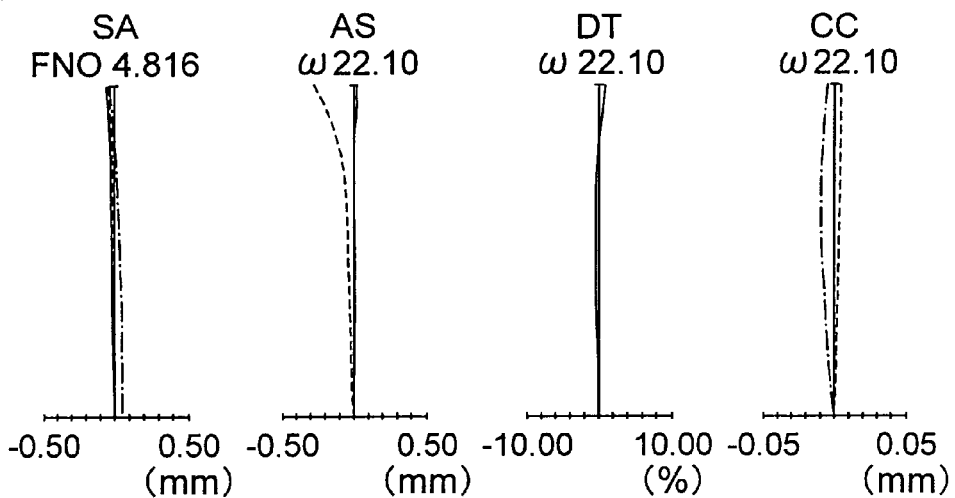

FIGS. 4B, 6B, and 8B show spherical aberration (SA), astigmatism (AS), distortion (DT) and chromatic aberration of magnification (CC) in a first intermediate state.

Figure 4C:
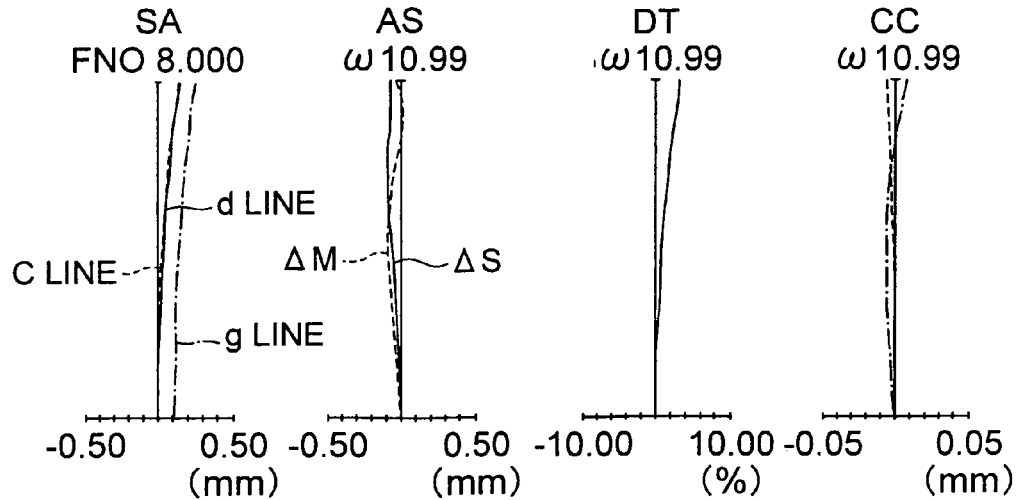
Figure 6C:
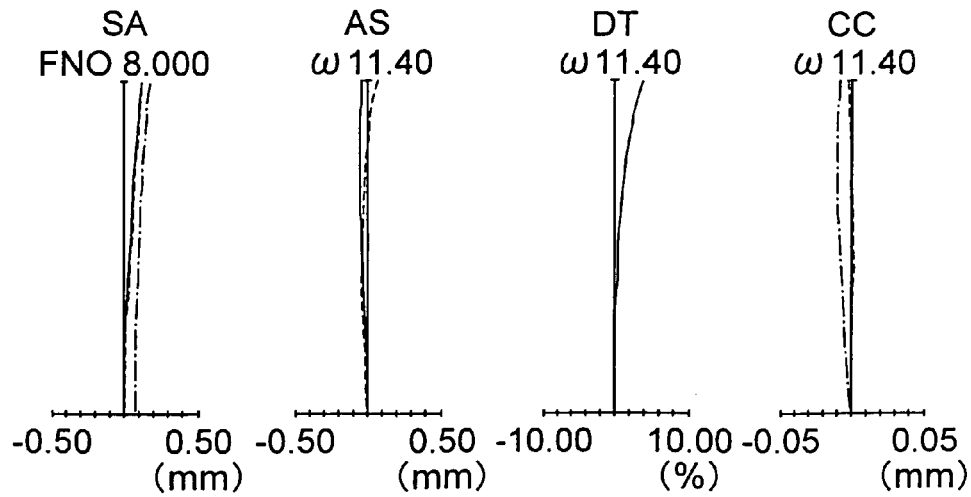
Figure 8C:
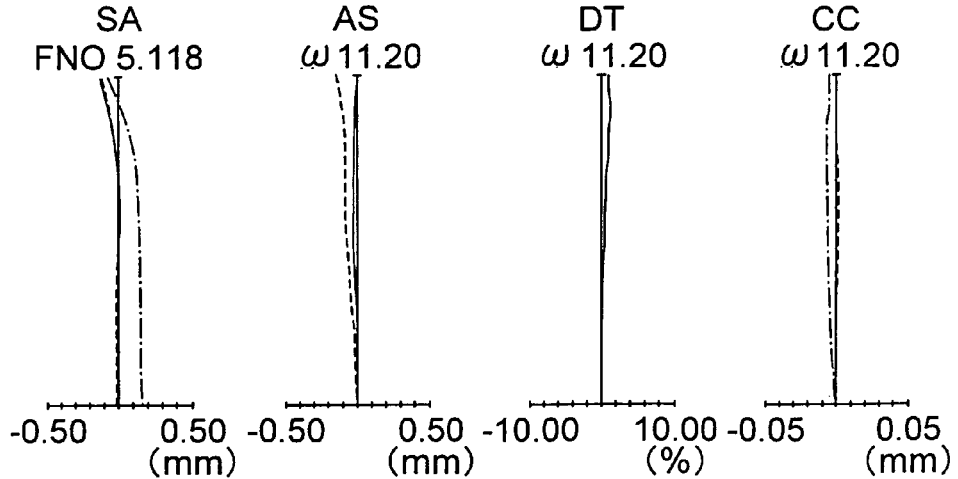

FIGS. 4C, 6C, and 8C show spherical aberration (SA), astigmatism (AS), distortion (DT) and chromatic aberration of magnification (CC) at a second intermediate end.

Figure 7D:
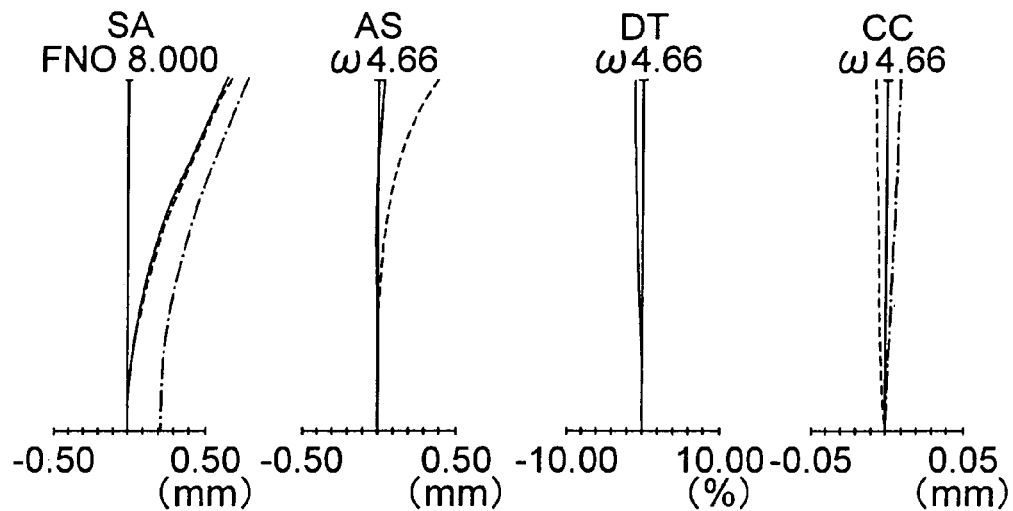
FIGS. 7D and 7E are diagrams similar to FIGS. 5D and 5E showing aberrations in the second embodiment in the state in which the zoom lens is focused on an object point at infinity.
Figure 9D:
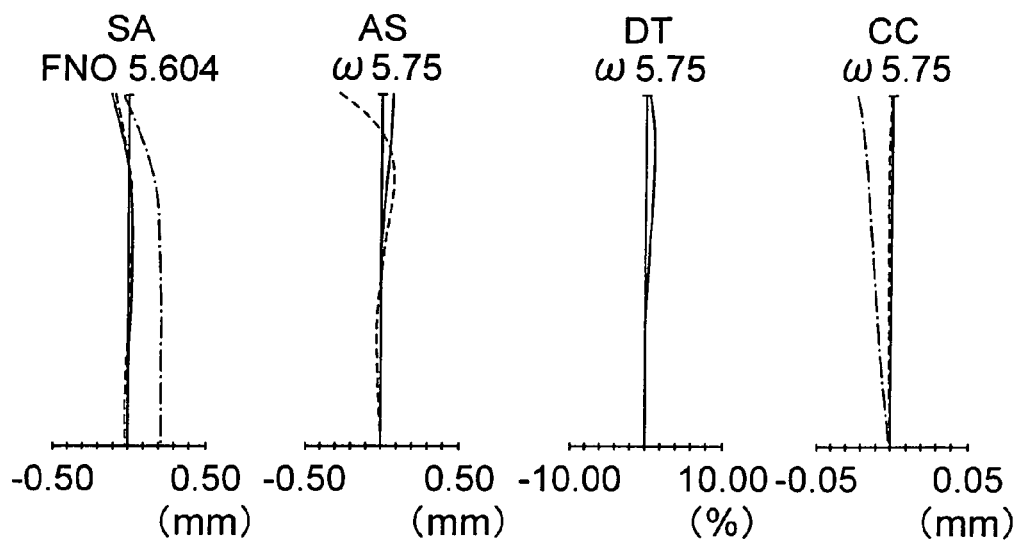
FIGS. 9D and 9E are diagrams similar to FIGS. 5D and 5E showing aberrations in the third embodiment in the state in which the zoom lens is focused on an object point at infinity.

FIGS. 5D, 7D, and 9D show spherical aberration (SA), astigmatism (AS), distortion (DT) and chromatic aberration of magnification (CC) at a third intermediate end.

Figure 7E:
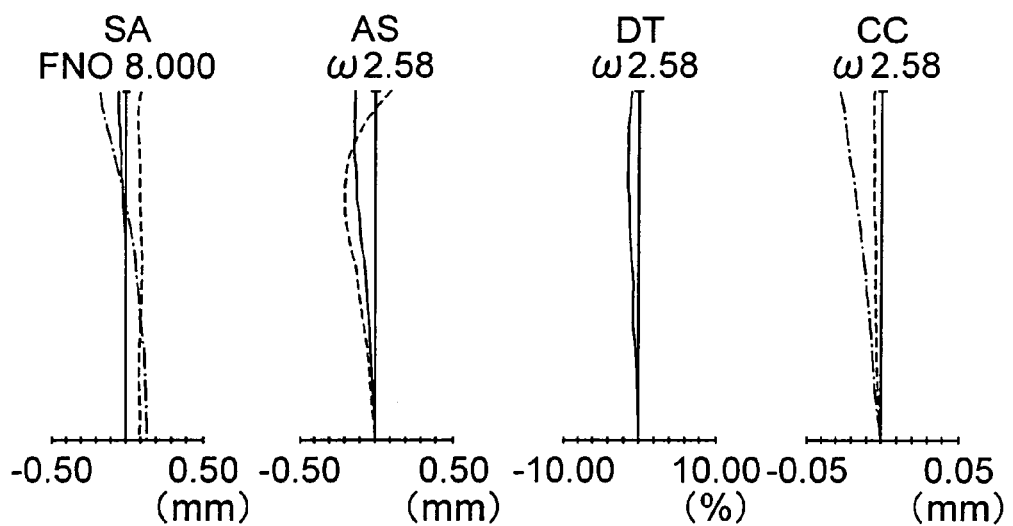
Figure 9E:
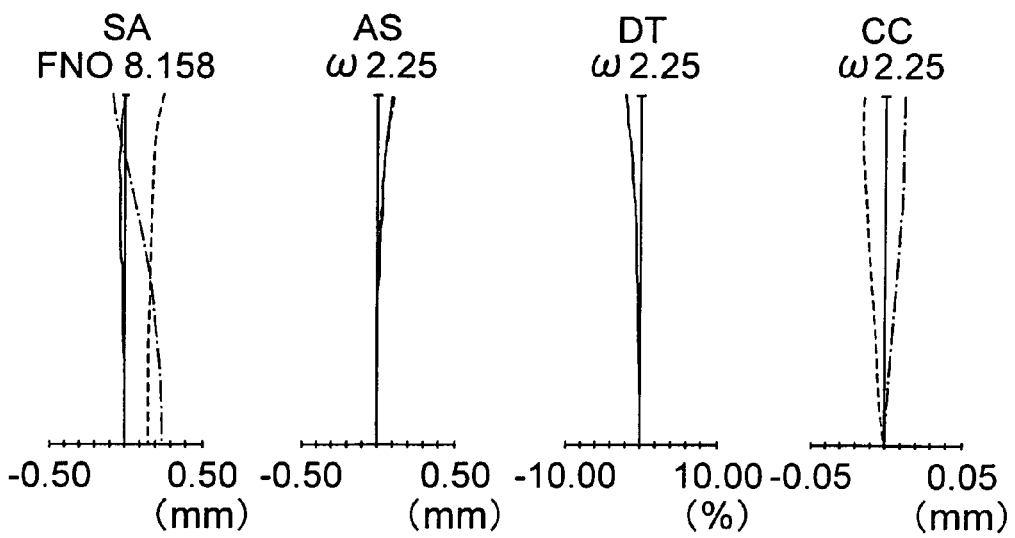

FIGS. 5E, 7E, and 9E show spherical aberration (SA), astigmatism (AS), distortion (DT) and chromatic aberration of magnification (CC) at the telephoto end.

In the aberrations diagrams, the sign "ω" represents half the angle of field.

Figure 10A:
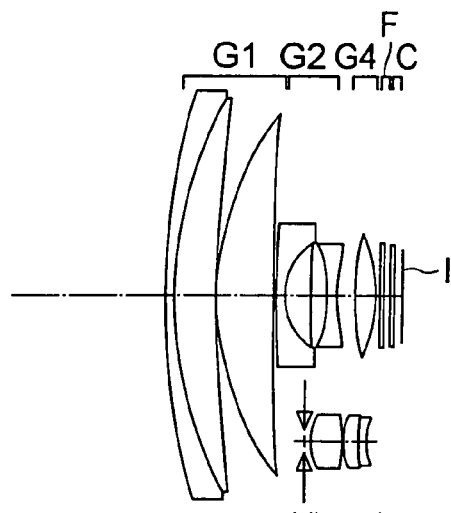
FIGS. 10A, 10B and 10C are cross sectional view of the lenses according to the first to third embodiments respectively in the collapsed state.
Figure 10B:
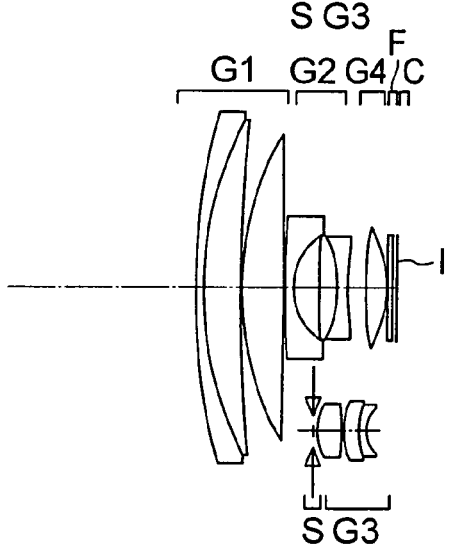
Figure 10C:
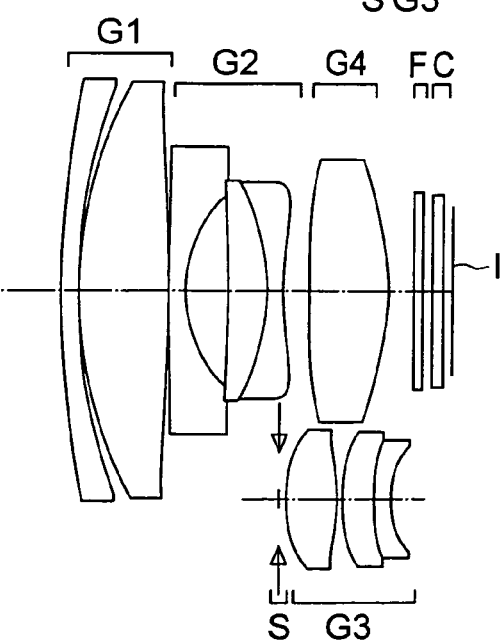

As shown in FIGS. 10A, 10B and 10C, when the zoom lenses of the first, second and third embodiments are col-lapsed, the first lens unit G1, the second lens unit G2 and the fourth lens unit G4 move along the optical axis of the lens units toward the image side, and the third lens unit moves away from the optical axis to a position behind the first lens unit G1 to stay side by side with the second lens unit G2 and the fourth lens unit G4.

Expressional condition values are shown as below:

| | Example 1 | Example 2 | Example 3 |
|---|---|---|---|
| (1) $f_3/f_t$ | 0.110 | 0.120 | 0.100 |
| (2) $f_1/f_t$ | 0.346 | 0.420 | 0.340 |
| (3) $|f_2|/f_t$ | 0.058 | 0.071 | 0.058 |
| (4) $\Sigma D1/\Sigma D2$ | 1.825 | 1.474 | 0.891 |
| (5) $f_4/f_t$ | 0.102 | 0.132 | 0.155 |
| (6) Zooming ratio $f_t/f_w$ | 20.637 | 18.362 | 20.832 |
| (7) $L_t/L_w$ | 1.548 | 1.630 | 1.581 |
| (8) $F_t$ | 8.000 | 8.000 | 8.158 |
| (9) $IH_w/f_w$ | 0.801 | 0.820 | 0.802 |
| total number of lenses | 10 | 10 | 9 |
| IH | 3.88 | 3.8 | 3.88 |
| f1 | 34.617 | 35.753 | 34.313 |
| f2 | −5.813 | −6.070 | −5.812 |
| f3 | 10.999 | 10.184 | 10.096 |
| f4 (fRL) | 10.166 | 11.216 | 15.595 |

| | Example 4 | Example 5 | Example 6 |
|---|---|---|---|
| (1) $f_3/f_t$ | 0.110 | 0.120 | 0.100 |
| (2) $f_1/f_t$ | 0.346 | 0.420 | 0.340 |
| (3) $|f_2|/f_t$ | 0.058 | 0.071 | 0.058 |
| (4) $\Sigma D1/\Sigma D2$ | 1.825 | 1.474 | 0.891 |
| (5) $f_4/f_t$ | 0.102 | 0.132 | 0.155 |
| (6) Zooming ratio $f_t/f_w$ | 20.637 | 18.362 | 20.832 |
| (7) $L_t/L_w$ | 1.548 | 1.630 | 1.581 |
| (8) $F_t$ | 8.000 | 8.000 | 8.158 |
| (9) $IH_w/f_w$ | 0.794 | 0.777 | 0.763 |
| Total number of lenses | 10 | 10 | 9 |
| f1 | 34.617 | 35.753 | 34.313 |
| f2 | −5.813 | −6.070 | −5.812 |
| f3 | 10.999 | 10.184 | 10.096 |
| f4 (fRL) | 10.166 | 11.216 | 15.595 |

Further, conditional expression values are shown as below:

| | Example 1 | Example 2 | Example 3 |
|---|---|---|---|
| (10) $(\Sigma D_{1-R})/f_t$ | 0.233 | 0.242 | 0.191 |
| (11) $(\Sigma D_{12R})/f_t$ | 0.180 | 0.188 | 0.141 |
| (12) $\Sigma d_3/f_t$ | 0.053 | 0.054 | 0.050 |
| (13) $\Delta_{1G2G3G}/(f_t - f_w)$ | 0.538 | 0.668 | 0.499 |
| (14) $f_{RL}/f_t$ | 0.102 | 0.132 | 0.155 |
| (15) $\Sigma D1/\Sigma D2$ | 1.825 | 1.474 | 0.891 |

| | Example 4 | Example 5 | Example 6 |
|---|---|---|---|
| (10) $(\Sigma D_{1-R})/f_t$ | 0.233 | 0.242 | 0.191 |
| (11) $(\Sigma D_{12R})/f_t$ | 0.180 | 0.188 | 0.141 |
| (12) $\Sigma d_3/f_t$ | 0.053 | 0.054 | 0.050 |
| (13) $\Delta_{1G2G3G}/(f_t - f_w)$ | 0.538 | 0.668 | 0.499 |
| (14) $f_{RL}/f_t$ | 0.102 | 0.132 | 0.155 |
| (15) $\Sigma D1/\Sigma D2$ | 1.825 | 1.474 | 0.891 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 11:
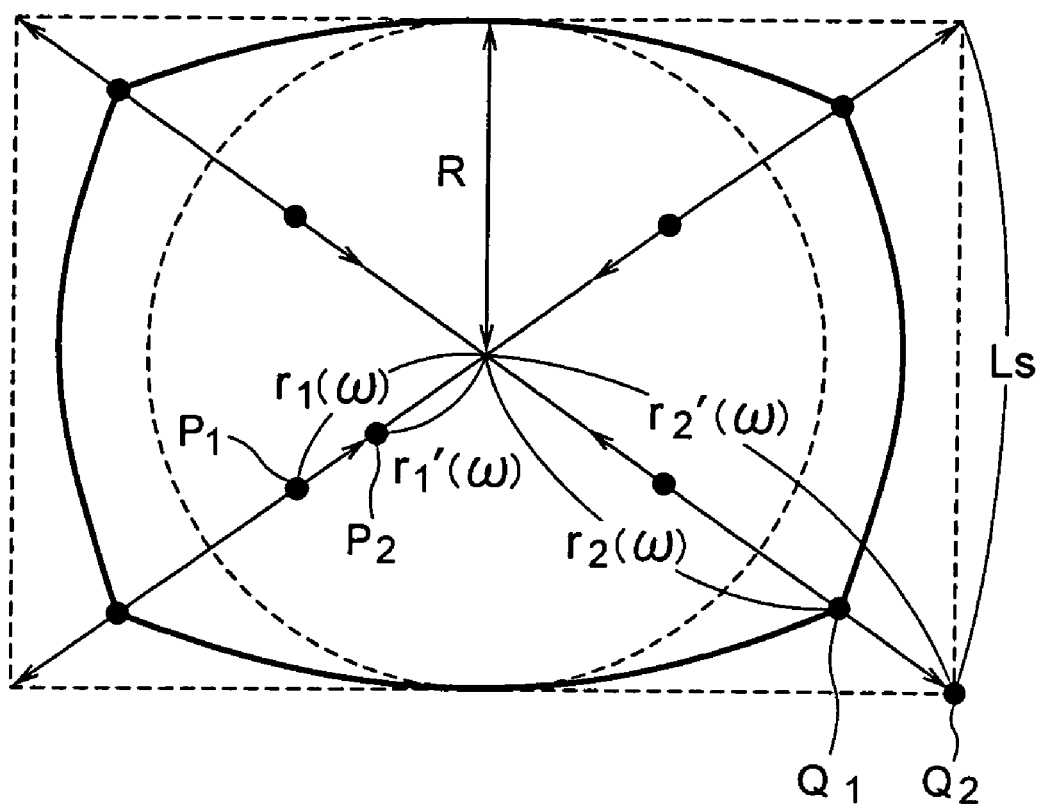
FIG. 11 is a diagram illustrating correction of distortion.

For example, as shown in FIG. 11, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 11, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega)=\alpha \cdot f \tan \omega (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement maybe made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$0 \leq R \leq 0.6$ Ls where, Ls is a length of a short side of the effective image pickup surface.

It is preferable that the radius R satisfies the following conditional expression.

$0.3$ Ls $\leq R \leq 0.6$ Ls

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $r'(\omega) = \alpha \cdot f \tan \omega$ near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $r'(\omega) = \alpha \cdot f \tan \omega$ near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $f = y/\tan \omega$ holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of ω becomes large.

(Digital Camera)

Figure 12:
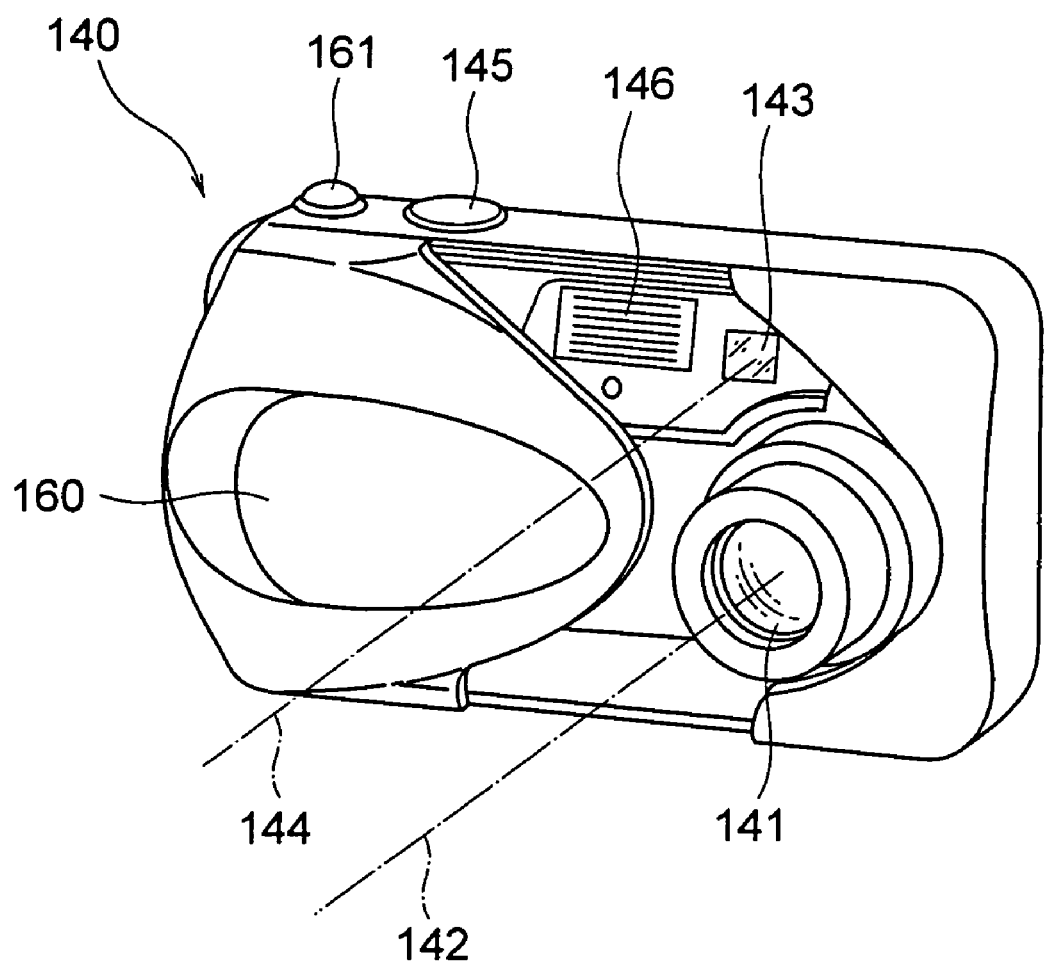
FIG. 12 is a front perspective view showing an outer appearance of a digital camera equipped with a zoom lens according to the present invention.
Figure 13:
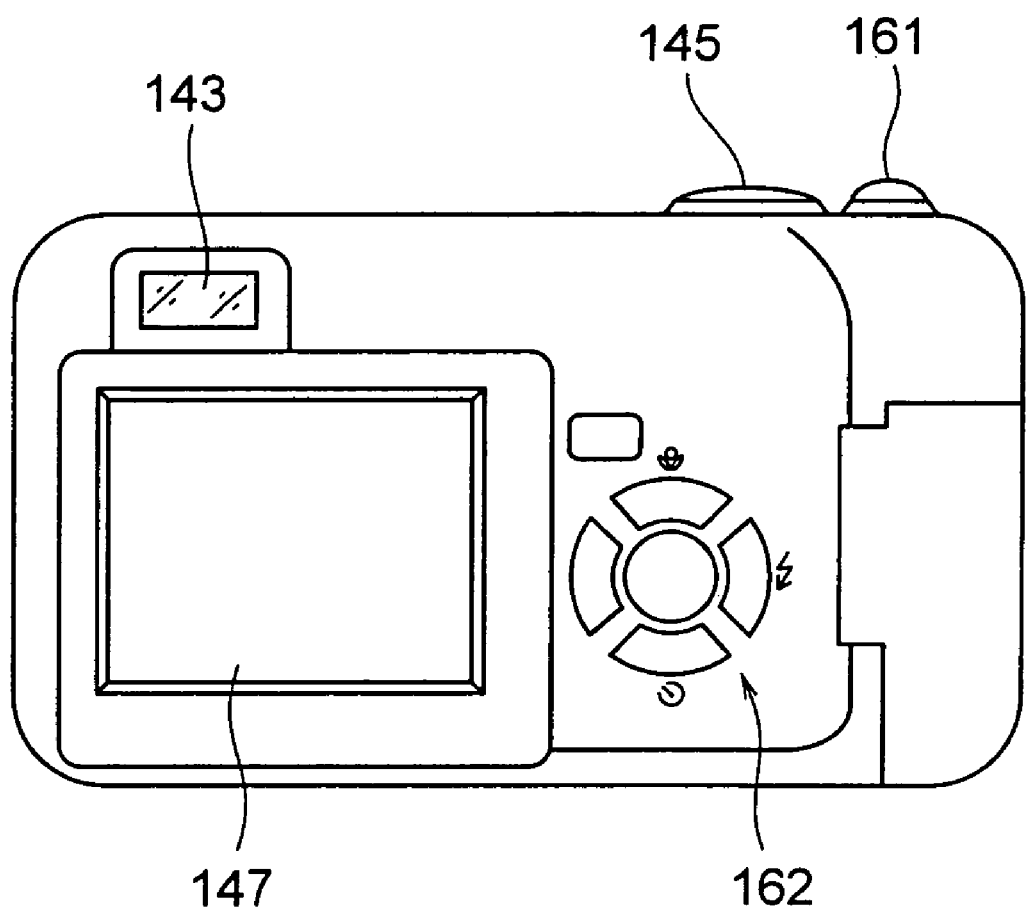
FIG. 13 is a rear perspective view of the digital camera.
Figure 14:
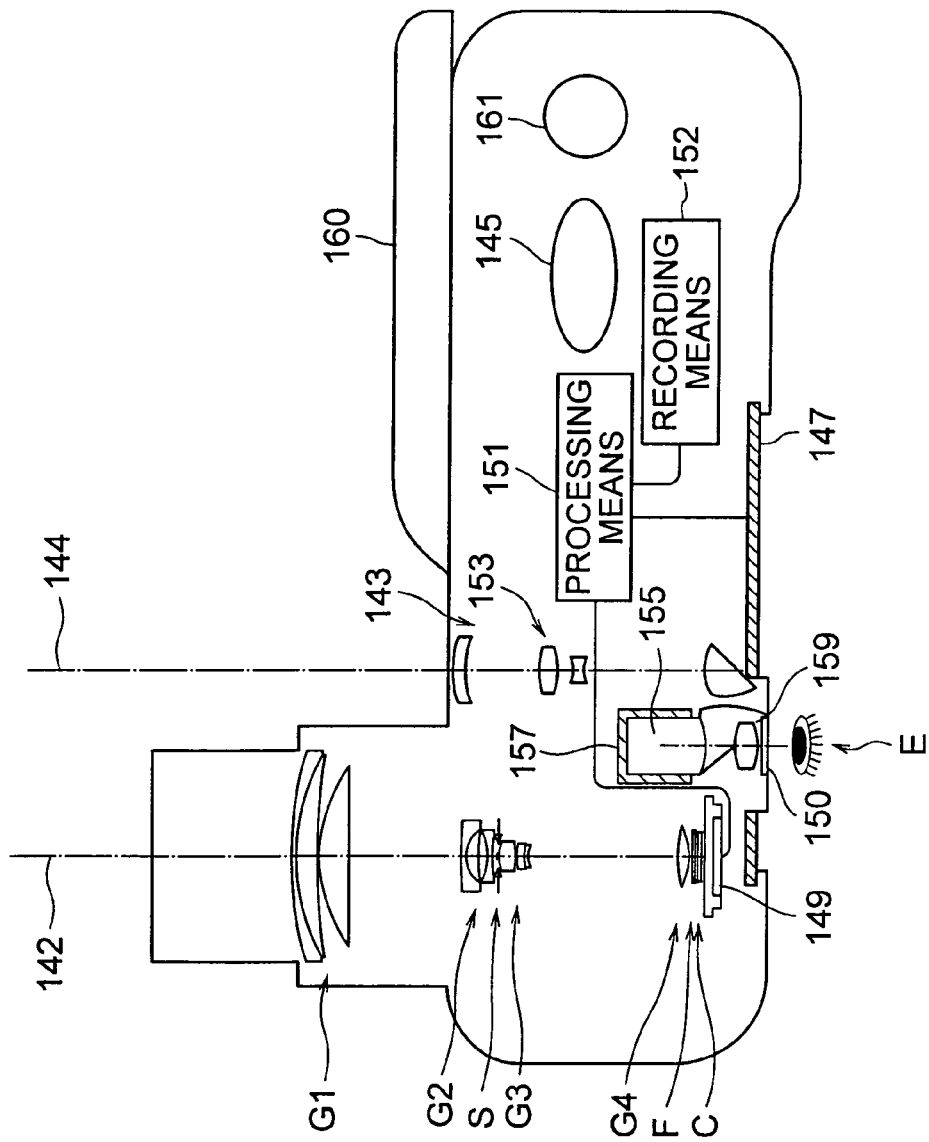
FIG. 14 is a cross sectional view of the digital camera.
Figure 15:
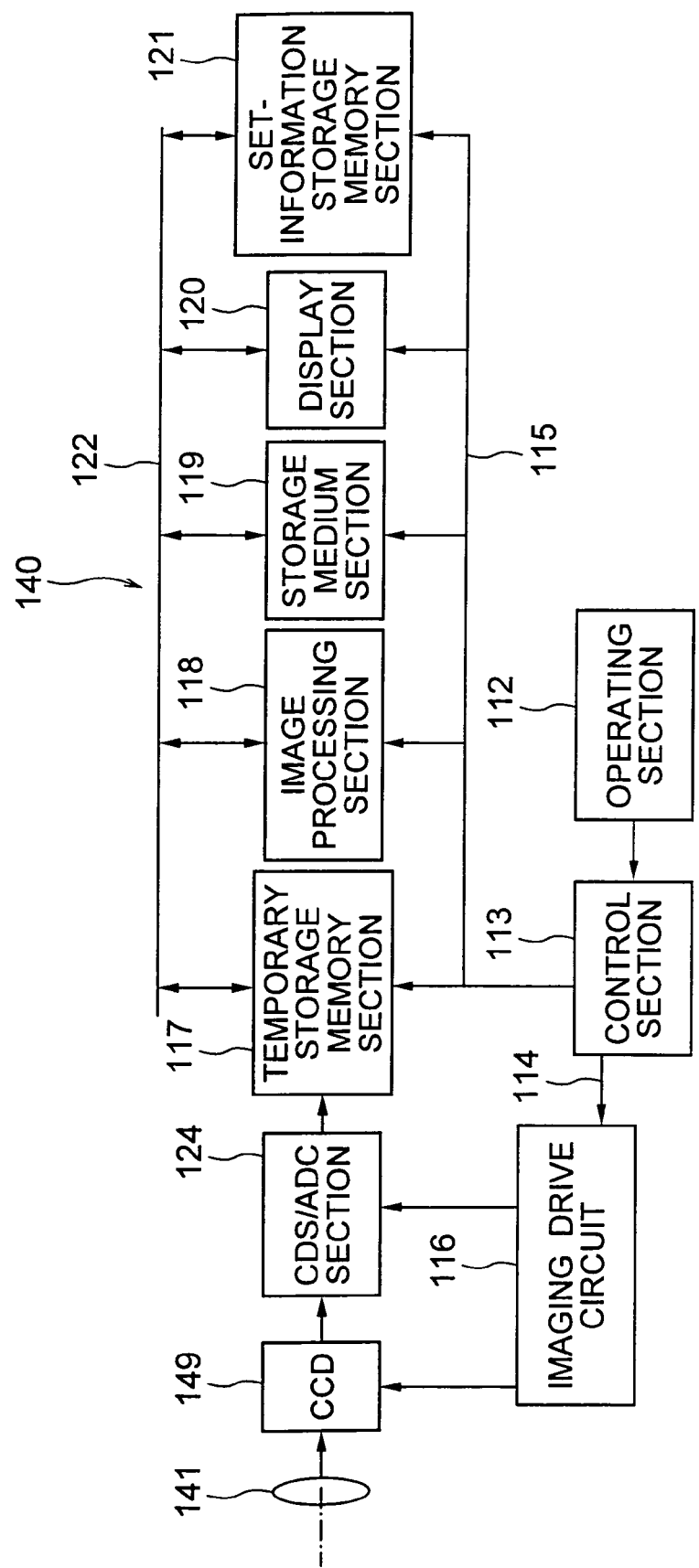
FIG. 15 is a block diagram of an internal circuit of a principal portion of the digital camera.

FIG. 12 to FIG. 14 are conceptual diagrams of a structure of a digital camera according to the present invention in which a zoom lens system described above is incorporated in a taking optical system 141. FIG. 12 is a front perspective view showing an appearance of a digital camera 140, FIG. 13 is a rear perspective view of the same, and FIG. 14 is a schematic cross-sectional view showing a structure of the digital camera 140. In FIG. 12 and FIG. 14, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 12, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

As per the above the zoom lens according to the present invention can be advantageously applied to a zoom lens that can achieve both compactness and high zoom ratio.

According to the invention, there can be provided a zoom lens that can easily achieve compactness and high zoom ratio. There can also be provided an image pickup apparatus equipped with such a zoom lens.

What is claimed is:

1. A zoom lens consisting, in order from an object side thereof, of:
   a front side lens unit having a negative refracting power at a wide angle end; and
   a rear side lens unit having a positive refracting power at the wide angle end, wherein
   the front side lens unit comprises a first lens unit located closest to the object side and having a positive refracting power and a second lens unit located on an image side of the first lens unit and having a negative refracting power, the distance between the first lens unit and the second lens unit being larger at a telephoto end than at the wide angle end,
   the rear side lens unit comprises a third lens unit located closer to the object side at the telephoto end than at the wide angle end and having a positive refracting power, the distance between the third lens unit and the second lens unit being smaller at the telephoto end than at the wide angle end, and
   the third lens unit satisfies the following condition:

$$0.01 < f_3/f_t < 0.16 \quad (1)$$

where $f_3$ is a focal length of the third lens unit, and $f_t$ is a focal length of the entire zoom lens system at the telephoto end,
   wherein the second lens unit satisfies the following condition:

$$0.01 < |f_2|/f_t < 0.10 \quad (3)$$

where $f_2$ is a focal length of the second lens unit, and $f_t$ is the focal length of the entire zoom lens system at the telephoto end.

2. A zoom lens consisting, in order from an object side thereof, of:
   a front side lens unit having a negative refracting power at a wide angle end; and
   a rear side lens unit having a positive refracting power at the wide angle end, wherein
   the front side lens unit comprises a first lens unit located closest to the object side and having a positive refracting power and a second lens unit located on an image side of the first lens unit and having a negative refracting power, the distance between the first lens unit and the second lens unit being larger at a telephoto end than at the wide angle end,
   the rear side lens unit comprises a third lens unit located closer to the object side at the telephoto end than at the wide angle end and having a positive refracting power, the distance between the third lens unit and the second lens unit being smaller at the telephoto end than at the wide angle end, and
   the third lens unit satisfies the following condition:

$$0.01 < f_3/f_t < 0.16 \quad (1)$$

where $f_t$ is a focal length of the third lens unit, and $f_t$ is a focal length of the entire zoom lens system at the telephoto end;
   wherein the zoom lens satisfies the following condition:

$$1.26 < \Sigma D1/\Sigma D2 < 3.00 \quad (4)$$

where $\Sigma D1$ is a thickness of the first lens unit on the optical axis, and $\Sigma D2$ is a thickness of the second lens unit on the optical axis, the thickness of each lens unit on the optical axis referring to an actual distance from an object side surface of the lens located closest to the object side in that lens unit to an image side surface of the lens located closest to the image side in that lens unit.

3. A zoom lens consisting, in order from an object side thereof, of:
   a front side lens unit having a negative refracting power at a wide angle end; and
   a rear side lens unit having a positive refracting power at the wide angle end, wherein
   the front side lens unit comprises a first lens unit located closest to the object side and having a positive refracting power and a second lens unit located on an image side of the first lens unit and having a negative refracting power, the distance between the first lens unit and the second lens unit being larger at a telephoto end than at the wide angle end,
   the rear side lens unit comprises a third lens unit located closer to the object side at the telephoto end than at the wide angle end and having a positive refracting power, the distance between the third lens unit and the second lens unit being smaller at the telephoto end than at the wide angle end, and
   the third lens unit satisfies the following condition:

$$0.01 < f_3/f_t < 0.16 \quad (1)$$

where $f_3$ is a focal length of the third lens unit, and $f_t$ is a focal length of the entire zoom lens system at the telephoto end;
   wherein the zoom lens satisfies the following conditions:

$$9 < f_t/f_w < 50 \quad (6)$$

$$1.1 < L_t/L_w < 2.0 \quad (7)$$

where $f_W$ is the focal length of the entire zoom lens system at the wide angle end, $L_t$ is an actual distance, on the optical axis, from the lens surface closest to the object side in the first lens unit to an image plane at the telephoto end, and $L_w$ is an actual distance, on the optical axis, from the lens surface closest to the object side in the first lens unit to the image plane at the wide angle end.

4. A zoom lens consisting, in order from an object side thereof, of:
   a front side lens unit having a negative refracting power at a wide angle end; and
   a rear side lens unit having a positive refracting power at the wide angle end, wherein
   the front side lens unit comprises a first lens unit located closest to the object side and having a positive refracting power and a second lens unit located on an image side of the first lens unit and having a negative refracting power, the distance between the first lens unit and the second lens unit being larger at a telephoto end than at the wide angle end,
   the rear side lens unit comprises a third lens unit located closer to the object side at the telephoto end than at the wide angle end and having a positive refracting power, the distance between the third lens unit and the second lens unit being smaller at the telephoto end than at the wide angle end, and
   the third lens unit satisfies the following condition:

$$0.01 < f_3/f_t < 0.16 \quad (1)$$

where $f_3$ is a focal length of the third lens unit, and $f_t$ is a focal length of the entire zoom lens system at the telephoto end;
   wherein every lens unit included in the zoom lens has an aspheric lens surface.

* * * * *